(12) United States Patent
Georgiev et al.

(10) Patent No.: US 8,315,476 B1
(45) Date of Patent: Nov. 20, 2012

(54) SUPER-RESOLUTION WITH THE FOCUSED PLENOPTIC CAMERA

(75) Inventors: Todor G. Georgiev, Sunnyvale, CA (US); Andrew Lumsdaine, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 370 days.

(21) Appl. No.: 12/690,869

(22) Filed: Jan. 20, 2010

Related U.S. Application Data

(60) Provisional application No. 61/145,926, filed on Jan. 20, 2009.

(51) Int. Cl.
*G06K 9/36* (2006.01)
*H04N 9/04* (2006.01)

(52) U.S. Cl. .................................. 382/276; 348/207.99

(58) Field of Classification Search .................. None
See application file for complete search history.

(56) References Cited

U.S. PATENT DOCUMENTS

| | | | |
|---|---|---|---|
| 725,567 A | 4/1903 | Ives | |
| 3,985,419 A | 10/1976 | Matsumoto et al. | |
| 4,180,313 A | 12/1979 | Inuiya | |
| 4,230,942 A | 10/1980 | Stauffer | |
| 4,580,219 A | 4/1986 | Pelc et al. | |
| 4,732,453 A | 3/1988 | de Montebello et al. | |
| 5,579,445 A * | 11/1996 | Loce et al. | 358/1.2 |
| 5,659,420 A | 8/1997 | Wakai et al. | |
| 5,946,077 A | 8/1999 | Nemirovskiy | |
| 5,987,164 A * | 11/1999 | Szeliski et al. | 382/154 |
| 6,097,394 A | 8/2000 | Levoy et al. | |
| 6,097,541 A | 8/2000 | Davies et al. | |
| 6,137,535 A | 10/2000 | Meyers | |
| 6,137,937 A | 10/2000 | Okano et al. | |
| 6,268,846 B1 | 7/2001 | Georgiev | |
| 6,301,416 B1 | 10/2001 | Okano et al. | |
| 6,317,192 B1 * | 11/2001 | Silverbrook et al. | 355/18 |
| 6,476,805 B1 | 11/2002 | Shum et al. | |

(Continued)

FOREIGN PATENT DOCUMENTS

EP 1548481 6/2005

(Continued)

OTHER PUBLICATIONS

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.

(Continued)

*Primary Examiner* — Manav Seth
(74) *Attorney, Agent, or Firm* — Robert C. Kowert; Meyertons, Hood, Kivlin, Kowert & Goetzel, P.C.

(57) ABSTRACT

Methods and apparatus for super-resolution in focused plenoptic cameras. By examining the geometry of data capture for super-resolution with the focused plenoptic camera, configurations for which super-resolution is realizable at different modes in the focused plenoptic camera are generated. A focused plenoptic camera is described in which infinity is super resolved directly, with registration provided by the camera geometry and the microlens pitch. In an algorithm that may be used to render super-resolved images from flats captured with a focused plenoptic camera, a high-resolution observed image is generated from a flat by interleaving pixels from adjacent microlens images. A deconvolution method may then be applied to the high-resolution observed image to deblur the image.

20 Claims, 32 Drawing Sheets

U.S. PATENT DOCUMENTS

| | | | |
|---|---|---|---|
| 6,570,613 B1* | 5/2003 | Howell | 348/219.1 |
| 6,738,533 B1 | 5/2004 | Shum et al. | |
| 6,838,650 B1 | 1/2005 | Toh | |
| 6,961,075 B2* | 11/2005 | Mindler et al. | 347/183 |
| 7,019,671 B2 | 3/2006 | Kawai | |
| 7,054,067 B2 | 5/2006 | Okano et al. | |
| 7,085,062 B2 | 8/2006 | Hauschild | |
| 7,113,231 B2* | 9/2006 | Conner et al. | 349/5 |
| 7,470,032 B2* | 12/2008 | Damera-Venkata et al. | 353/94 |
| 7,620,309 B2* | 11/2009 | Georgiev | 396/113 |
| 7,732,744 B2 | 6/2010 | Utagawa | |
| 7,792,423 B2 | 9/2010 | Raskar et al. | |
| 7,880,794 B2 | 2/2011 | Yamagata et al. | |
| 7,962,033 B2 | 6/2011 | Georgiev et al. | |
| 7,978,234 B2* | 7/2011 | Yano et al. | 348/239 |
| 8,019,215 B2 | 9/2011 | Georgiev et al. | |
| 2002/0140835 A1 | 10/2002 | Silverstein | |
| 2004/0114807 A1 | 6/2004 | Lelescu et al. | |
| 2004/0223214 A1 | 11/2004 | Atkinson | |
| 2005/0122418 A1 | 6/2005 | Okita et al. | |
| 2006/0104542 A1 | 5/2006 | Blake et al. | |
| 2007/0091197 A1 | 4/2007 | Okayama et al. | |
| 2007/0252074 A1 | 11/2007 | Ng et al. | |
| 2008/0056549 A1 | 3/2008 | Hamill et al. | |
| 2008/0107231 A1 | 5/2008 | Miyazaki et al. | |
| 2008/0152215 A1 | 6/2008 | Horie et al. | |
| 2008/0165270 A1 | 7/2008 | Watanabe et al. | |
| 2008/0166063 A1 | 7/2008 | Zeng | |
| 2008/0187305 A1 | 8/2008 | Raskar et al. | |
| 2008/0193026 A1 | 8/2008 | Horie et al. | |
| 2008/0218610 A1 | 9/2008 | Chapman et al. | |
| 2008/0247623 A1 | 10/2008 | Delso et al. | |
| 2009/0002504 A1* | 1/2009 | Yano et al. | 348/218.1 |
| 2009/0041381 A1 | 2/2009 | Georgiev | |
| 2009/0041448 A1 | 2/2009 | Georgiev | |
| 2009/0086304 A1 | 4/2009 | Yurlov et al. | |
| 2009/0185801 A1 | 7/2009 | Georgiev et al. | |
| 2009/0295829 A1 | 12/2009 | Georgiev et al. | |
| 2010/0026852 A1 | 2/2010 | Ng et al. | |
| 2010/0085468 A1 | 4/2010 | Park et al. | |
| 2010/0097491 A1* | 4/2010 | Farina et al. | 348/223.1 |
| 2010/0205388 A1 | 8/2010 | MacInnis | |
| 2010/0265386 A1 | 10/2010 | Raskar et al. | |
| 2011/0043604 A1* | 2/2011 | Peleg et al. | 348/36 |
| 2011/0063354 A1* | 3/2011 | Enge | 347/14 |
| 2011/0141224 A1* | 6/2011 | Stec et al. | 348/36 |

FOREIGN PATENT DOCUMENTS

| | | |
|---|---|---|
| JP | 7270791 | 10/1995 |
| JP | 2001330769 | 11/2001 |
| JP | 2004239932 | 8/2004 |
| WO | 01/37025 | 5/2001 |
| WO | 2007/115281 | 10/2007 |

OTHER PUBLICATIONS

Georgiev, et al. "Light-Field Capture by Multiplexing in the Frequency Domain," ADOBE Technical Report, Apr. 2007, all pages.

JP504669 (1975), all pages, english equivalent is U.S. Patent 3985419, dated Oct. 12, 1976 by Matsumoto, et al.

Levoy, Mark et al., "Light Field Microscopy," Stanford University, Submitted to Siggraph 2006, 5 pages.

Zhang, et al., "A Survey on Image-based Rendering-Representation, Sampling and Compression," Signal Processing, Image Communication, Elsevier Science Publishers, vol. 19, No. 1, Jan. 1, 2004, 28 pages.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.

Georgiev T., Wainer M.: "Morphing Between Multiple Images," Tech. Rep. (1997).

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

Xiao J., Shah M.: "Tri-view Morphing," Computer Vision and Image Understanding 96, 3 (2004), 345-366.

Lippmann G.: "Epreuves reversible donnant la sensation du relief ("Reversible Prints Providing the Sensation of Depth")", Journal of Physics 7 (1908), pp. 821-825.

Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.

Lee S., Wolberg G., Shin S.: "Polymorph: Morphing Among Multiple Images," IEEE Computer Graphics and Applications (1998).

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.

Naemura T., Yoshida T., Harashima H.: "3d Computer Graphics Based on Integral Photography," Optics Express, vol. 8, 2 (2001).

Zitnick C. L., Jojic N., Kang S.: "Consistent Segmentation for Optical Flow Estimation" In Proceedings of IEEE International Conference on Computer Vision (ICCV) (2005).

Seitz S. M., Dyer C. R.: "View Morphing," ACM Trans. Graph. (1996), 21-30.

Stevens R., Harvey T.: "Lens Arrays for a Three-dimensional Imaging System," Journal of Optics A, vol. 4 (2002).

Stewart J., Yu J., Gortler S. J., McMillan L.: "A New Reconstruction Filter for Undersampled Light Field," Eurographics Symposium on Rendering (2003), 150-156.

Vaish V., Wilburn B., Joshi N., Levoy M.: "Using Plane+ Parallax to Calibrate Dense Camera Arrays," In Proceedings of IEEE Conference on Computer Vision and Pattern Recognition (CVPR) (2004).

Chang, et al., "Light Field Compression Using Disparity-Compensated Lifting and Shape Adaptation," IEEE Transactions on Image Processing, vol. 15, No. 4, Apr. 2006, pp. 793-806.

U.S. Appl. No. 12/574,183, filed Oct. 6, 2009.

U.S. Appl. No. 12/144,411, filed Jun. 23, 2008.

U.S. Appl. No. 12/186,396, filed Jun. 23, 2008.

U.S. Appl. No. 11/874,611, filed Oct. 18, 2007.

U.S. Appl. No. 11/627,141, filed Jan. 25, 2007.

Sebe, et al., "Mutli-View Geometry Estimation for Light Field Compression," VMV 2002, 8 pages.

Levoy, et al. "Recording and controlling the 4D light field in a microscope using microlens arrays", Journal of Microscopy, 2009, 19 pages.

U.S. Appl. No. 12/130,725, filed May 30, 2008.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.

U.S. Appl. No. 12/690,569, filed Jan. 20, 2010.

U.S. Appl. No. 12/111,735, filed Apr. 29, 2008.

Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.

Levoy, Mark, "Optical Recipes for Light Microscopes," Stanford Computer Grpahics Laboratory Technical Memo 2006-001, Jun. 20, 2006, 10 pages.

U.S. Appl. No. 12/790,677, filed May 28, 2010.

Yang, J C, et al., "A Real-Time Distributed Light Field Camera," Rendering Techniques 2002, Eurographics Workshop Proceedings, PIS, Italy, Jun. 26-28, 2002, 9 pages.

M. Levoy, "Light Fields and computational Imaging," Computer [Online], vol. 39, No. 8, Aug. 2006, pp. 46-55, XP002501300.

J. Neumann, et al., "Eyes from Eyes Analysis of Camera Design Using Plenoptic Video Geometry," Dec. 2001, 20 pages, XP002509893.

Todor Georgiev and Chintan Intwala: "Light Field Camera Design for Integral View Photography," Adobe Tech. Rep., 2006, 13 pages.

J. Chai, S. Chan, H. Shum, and X. Tong: "Plenoptic Sampling", ACM Trans. Graph., pp. 307-318, 2000.

F. Durand, N. Holzschuch, C. Soler, E. Chan, and F. Sillion: "A frequency Analysis of Light Transport," ACM Trans. Graph., pp. 1115-1126, 2005.

U.S. Appl. No. 12/690,871, filed Jan. 20, 2010.

* cited by examiner

*(Keplerian telescopic case)*

*(Galilean telescopic case)*

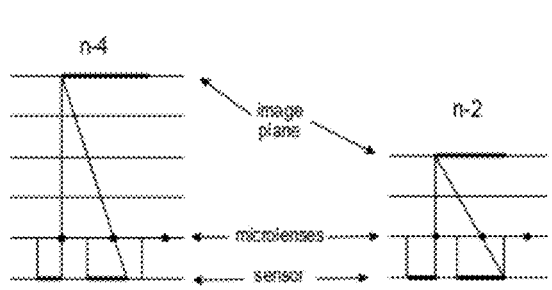 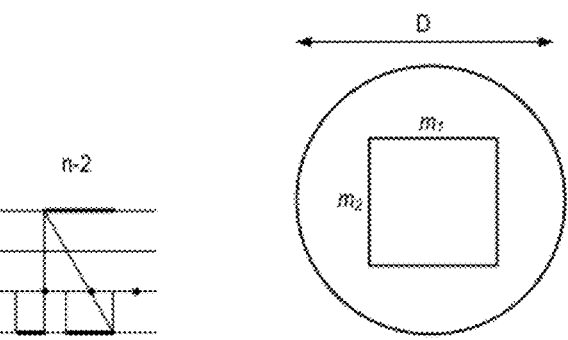
FIG. 14A  FIG. 14B  FIG. 15
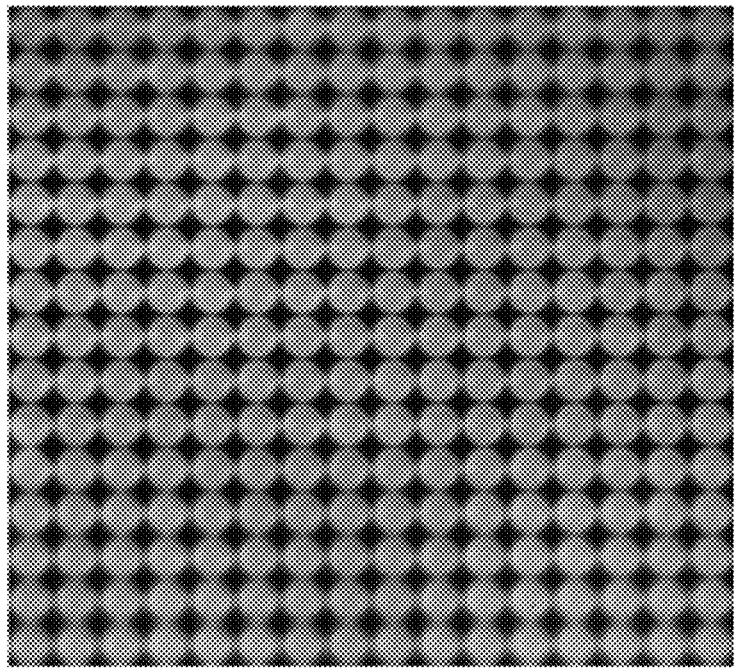
FIG. 16

SUPER-RESOLUTION WITH THE FOCUSED PLENOPTIC CAMERA

PRIORITY INFORMATION

This application claims benefit of priority of U.S. Provisional Application Ser. No. 61/145,926 entitled "Super-resolution with the Focused Plenoptic Camera" filed Jan. 20, 2009, the content of which is incorporated by reference herein in its entirety.

BACKGROUND

Description of the Related Art

In a conventional camera, the main lens maps the 3D world of the scene outside camera into a 3D world inside camera. FIG. 1 illustrates imaging in a conventional camera. "Inside world" represents inside the camera. The shaded oval regions represent the order of depths in the outside world, and the corresponding depths inside the camera. One particular image plane inside the camera is shown. The mapping of the 3D world of the scene outside camera into a 3D world inside camera is governed by the lens equation:

$$\frac{1}{A} + \frac{1}{B} = \frac{1}{F}$$

where A and B are respectively the distances from the lens to the object plane and from the lens to the image plane. This equation is normally used to describe the effect of a single image mapping between two fixed planes. In reality, however, the lens equation describes an infinite number of mappings—it constrains the relationship between, but does not fix, the values of the distances A and B. That is, every plane in the outside scene (which is described as being at some distance A from the objective lens) is mapped by the objective lens to a corresponding plane inside of the camera at a distance B. When a sensor (e.g., conventional film, a charge-coupled device (CCD), etc.) is placed at a distance B between F and ∞ (infinity) inside the camera, the sensor captures an in-focus image of the corresponding plane at A that was mapped from the scene in front of the lens.

Conventional cameras render a three-dimensional scene onto a two-dimensional sensor. During operation, a conventional digital camera captures a two-dimensional (2-D) image representing a total amount of light that strikes each point on a photosensor within the camera. However, this 2-D image contains no information about the direction of the light that strikes the photosensor. The image captured by a conventional camera essentially integrates the radiance function over its angular portion, resulting in a two-dimensional intensity as a function of position. The angular information of the original radiance is lost. Thus, conventional cameras fail to capture a large amount of optical information.

Light-Field or Radiance Capturing Cameras

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

Light-fields, i.e. radiance, may be captured with a conventional camera. In one conventional method, M×N images of a scene may be captured from different positions with a conventional camera. If, for example, 8×8 images are captured from 64 different positions, 64 images are produced. The pixel from each position (i, j) in each image are taken and placed into blocks, to generate 64 blocks. FIG. 2 illustrates an example prior art light-field camera, or camera array, which employs an array of two or more objective lenses 110. Each objective lens focuses on a particular region of photosensor 108, or alternatively on a separate photosensor 108. This light-field camera 100 may be viewed as a combination of two or more conventional cameras that each simultaneously records an image of a subject on a particular region of photosensor 108 or alternatively on a particular photosensor 108. The captured images may then be combined to form one image.

FIG. 3 illustrates an example prior art plenoptic camera, another type of radiance capturing camera, that employs a single objective lens and a microlens or lenslet array 106 that includes, for example, about 100,000 lenslets. In a conventional plenoptic camera 102, lenslet array 106 is fixed at a small distance (~0.5 mm) from a photosensor 108, e.g. a charge-coupled device (CCD). In conventional plenoptic cameras, the microlenses are placed and adjusted accurately to be exactly at one focal length f from the sensor 108. This is done by placing the array of microlenses at distance f from the sensor, where f is the focal length of the microlenses. Another way to say this is that, for the microlenses, f is chosen to be equal to the distance to the photosensor 108. In other words, the microlenses are focused on infinity, which is essentially equivalent to focusing the microlenses on the main lens 104, given the large distance of the microlenses to the main lens relative to the focal length of the microlenses. Thus, the raw image captured with plenoptic camera 102 is made up of an array of small images, typically circular, of the main lens 108. These small images may be referred to as microimages. However, in conventional plenoptic camera 102, each microlens does not create an image of the internal world on the sensor 108, but instead creates an image of the main camera lens 104.

The lenslet array 106 enables the plenoptic camera 102 to capture the light-field, i.e. to record not only image intensity, but also the distribution of intensity in different directions at each point. Each lenslet splits a beam coming to it from the main lens 104 into rays coming from different locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 102 generates a microimage at each macropixel. The plenoptic photograph captured by a camera 102 with, for example, 100,000 lenslets will contain 100,000 macropixels, and thus generate 100,000 microimages of a subject. Each macropixel contains different angular samples of the light rays coming to a given microlens. Each macropixel contributes to only one pixel in the different angular views of the scene; that is, only one pixel from a macropixel is used in a given angular view. As a result, each angular view contains 100,000 pixels, each pixel contributed from a different macropixel. Another type of integral or light-field camera is similar to the plenoptic camera of FIG. 3, except that an array of pinholes is used between the main lens and the photosensor instead of an array of lenslets.

FIG. 4 further illustrates an example prior art plenoptic camera model. In conventional plenoptic camera 102, the microlens-space system swaps positional and angular coordinates of the radiance at the microlenses. For clarity, only the rays through one of the microlenses are illustrated. The conventional optical analysis of such a plenoptic camera considers it as a cascade of a main lens system followed by a microlens system. The basic operation of the cascade system is as follows. Rays focused by the main lens 104 are separated by the microlenses 106 and captured on the sensor 108. At their point of intersection, the rays have the same position but different slopes. This difference in slopes causes the separation of the rays when they pass through a microlens-space system. In more detail, each microlens functions to swap the positional and angular coordinates of the radiance, then this new positional information is captured by the sensor 108. Because of the swap, it represents the angular information at the microlens. As a result, each microlens image captured by sensor 108 represents the angular information for the radiance at the position of the optical axis of the corresponding microlens.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image sensor technology, on the other hand, is only two-dimensional, and light-field imagery must therefore be captured and represented in flat (two dimensional) form. A variety of techniques have been developed to transform and capture the 4D radiance in a manner compatible with 2D sensor technology. This may be referred to as a flat representation of the 4D radiance (or light-field), or simply as a flat.

SUMMARY

Various embodiments of methods and apparatus for super-resolution in focused plenoptic cameras are described. Light fields carry a significant amount of information. This information can be used to generate novel effects when rendering. In embodiments of a focused plenoptic camera, deliberate spatio-angular trade-offs may be made to obtain significant improvements in spatial resolution when compared to conventional plenoptic cameras. The focused plenoptic camera works as an array of cameras (technically, an array of microcameras). These microcameras are focused on the photographed object, a unique feature that distinguishes the focused plenoptic camera from conventional plenoptic cameras. Based on this feature, super-resolution techniques are described that can be applied to the focused plenoptic camera and to the rendering of light-fields captured by the focused plenoptic camera. With the application of super-resolution techniques to embodiments of the focused plenoptic camera, the attainable spatial resolution of the focused plenoptic camera may be further increased.

By examining the geometry of data capture for super-resolution with the focused plenoptic camera, configurations for which super-resolution is realizable at different modes (e.g., 2×2 and 3×3 super-resolution) in the focused plenoptic camera are generated.

The focused plenoptic camera has the unique characteristic that there is one special depth in the scene, the depth of infinity, which is always mapped to the same location in front of the microlenses, one focal length from the main camera lens. Infinity is also the depth that benefits most from focused plenoptic camera super-resolution. This is also the depth that can be handled with highest precision for super-resolution since it is fixed and subpixel correspondence is set and exactly known in advance. For a given type of super-resolution, there are a number of planes that satisfy the subpixel shift condition. As these planes approach the microlens array, the planes become closer together. The plane corresponding to infinity $p_\infty$ is the farthest plane from the microlens array at which there is an image to capture. The separation between this plane and the previous plane is the largest. This makes this the plane with most reliable correspondence, and best for super-resolution.

A focused plenoptic camera may thus be designed and implemented such that infinity is super resolved directly, with registration provided by the camera geometry and the microlens pitch. This avoids estimation of registration from the imagery. At the same time, the registration is much more precise and reliable.

The following broadly describes a super-resolution algorithm that may be used, for example, to render super-resolved images from flats captured with a focused plenoptic camera appropriately configured for super-resolution. A high-resolution observed image is generated from a flat captured by a focused plenoptic camera by interleaving pixels from adjacent microlens images (microimages). A deconvolution method, for example with Gaussian and sparse priors, may then be applied to the high-resolution observed image to deblur the image.

BRIEF DESCRIPTION OF THE DRAWINGS

FIG. 14A shows the ray geometry in the Keplerian telescopic case for n=4.

FIG. 14B shows the ray geometry in the Keplerian telescopic case for n=2.

FIG. 15 illustrates a lens circle (or microimage) of diameter D and a patch or crop of size $m_1 \times m_2$, where at least one of $m_1$ and $m_2$ is an integer greater than or equal to 2.

FIG. 16 shows a zoom into an example microlens array.

Figure 1:
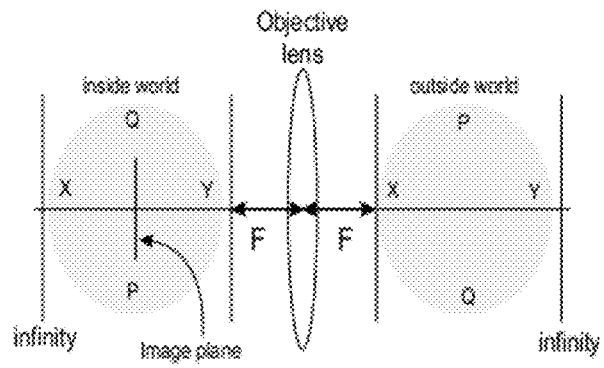
FIG. 1 illustrates imaging in a conventional camera.
Figure 2:
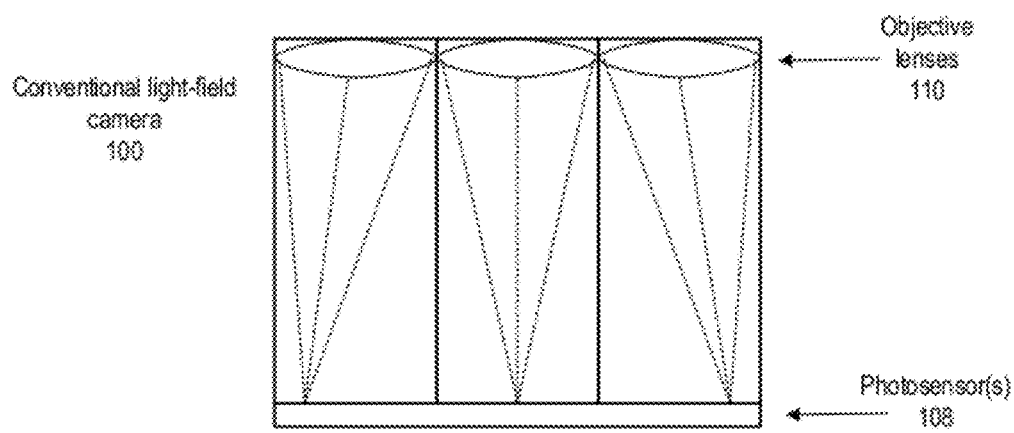
FIG. 2 illustrates an example prior art light-field camera, or camera array, which employs an array of two or more objective lenses.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for full-resolution light-field capture and rendering are described. Embodiments of a full-resolution radiance camera, which may also be referred to as a radiance camera or a focused plenoptic camera, and of a method for rendering high-resolution images from flat 2D representations of the 4D light-field, referred to herein as flats, captured by embodiments of the focused plenoptic camera, are described. The method for rendering high-resolution images from flats captured by embodiments of the focused plenoptic camera may be referred to as a full-resolution light-field rendering method, or simply as the light-field rendering method. The term "full resolution" does not directly refer to sensor resolution of the camera, but instead refers to resolution as supported by the captured radiance data.

Light-field photography enables many new possibilities for digital imaging because it captures both spatial and angular information, i.e., the full four-dimensional radiance, of a scene. High-resolution is required in order to capture four-dimensional data with a two-dimensional sensor. However, images rendered from this data as projections of the four-dimensional radiance onto two spatial dimensions using conventional light-field cameras and conventional light-field rendering methods are at significantly lower resolutions. Embodiments of the focused plenoptic camera and of the full-resolution light-field rendering method more adequately meet the resolution and image size expectations of modern photography than do conventional light-field cameras and rendering methods.

In embodiments of the focused plenoptic camera, the microlenses in the microlens array are focused on the image plane of the main camera lens, rather than on the main camera lens itself as in conventional plenoptic cameras. In the image plane, there is a real image of a scene in front of the camera and refracted by the main lens to the image plane, but there is nothing there physically (other than light); the image plane is simply a plane location in space that can be considered to have an image "in the air" as created by the main lens. The microlenses, being focused on the image plane instead of on the main lens, can capture the image of the scene at the image plane. Each microlens captures a small area or region of the image at the image plane and maps or projects the captured region onto a corresponding region of the photosensor. The imaging property of the focused plenoptic camera may be viewed as two steps: from the world through the main lens to the image plane, and then from the image plane through the microlenses to the photosensor. This is similar to a cascade of two cameras, but the second camera is actually many small cameras, as each microlens is effectively a little camera that captures a small image from the image plane. This is also similar to the way a telescope operates. By focusing the microlenses on the image produced by the main lens, embodiments of the focused plenoptic camera are able to fully capture the positional information of the radiance. Embodiments of the full-resolution light-field rendering method may be used to render full-resolution images from flats captured by embodiments of the focused plenoptic camera, producing output images at a dramatically higher resolution than conventional light-field rendering techniques. Embodiments may render images at spatial resolutions that meet the expectations of modern photography (e.g., 10 megapixel and beyond), making light-field photography much more practical.

An analysis of light-field camera structure and optics is given below that provides insight on the interactions between the main lens system and the microlens array in light-field cameras. Based on results of this analysis, embodiments exploit the fact that, at every plane of depth, the radiance contains a considerable amount of positional information about the scene, encoded in the angular information at that plane. Accordingly, embodiments may be referred to as full-resolution because embodiments make full use of both angular and positional information that is available in the four-dimensional radiance, as shown in the analysis. In contrast to super-resolution techniques, which create high-resolution images from subpixel shifted low-resolution images, embodiments render high-resolution images directly from the radiance data. Moreover, embodiments may generate light-field images that are amenable to radiance processing techniques such as Fourier slice refocusing.

Figure 5A:
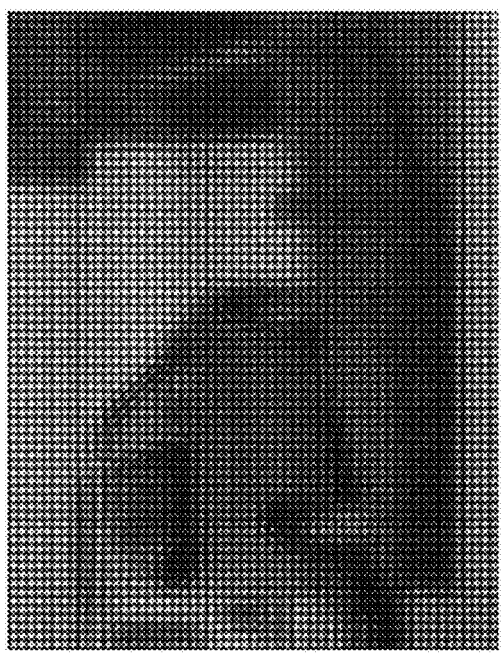
FIG. 5A shows a raw light-field image, or flat, as captured by a plenoptic camera.
Figure 5C:
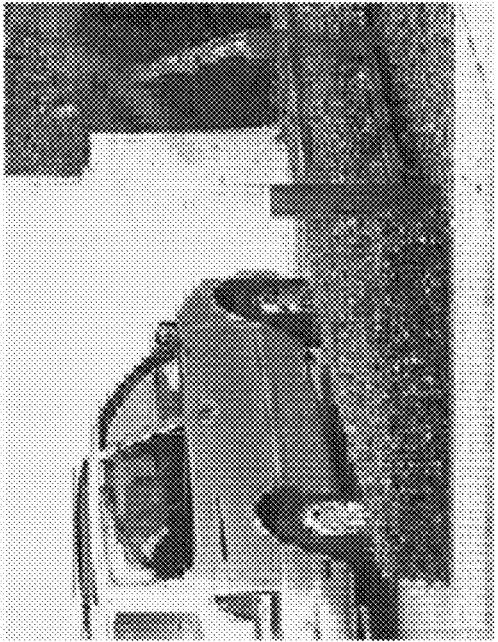
FIG. 5C shows a final image rendered from the flat of FIG. 5A according to an embodiment of the full-resolution light-field rendering method.
Figure 5B:
FIG. 5B shows a final image rendered from the flat of FIG. 5A according to a conventional rendering method.

FIGS. 5A through 5C show, for comparison, results from a conventional plenoptic camera and rendering method and results from example embodiments of a focused plenoptic camera and full-resolution light-field rendering method as described herein. FIG. 5A shows a raw light-field image as captured by a plenoptic camera. Note that, to the untrained human eye, the raw light-field image captured by a conventional plenoptic camera may look similar to the raw light-field image captured by an embodiment of the focused plenoptic camera. FIG. 5B shows a conventionally rendered final image, and FIG. 5C shows a final image rendered according to an embodiment of the full-resolution light-field rendering method as described herein. Even in this small, grayscale format, a drastic improvement in spatial resolution in FIG. 5C when compared to the spatial resolution in FIG. 5B is easily observable.

Focused Plenoptic Cameras

Figure 3:
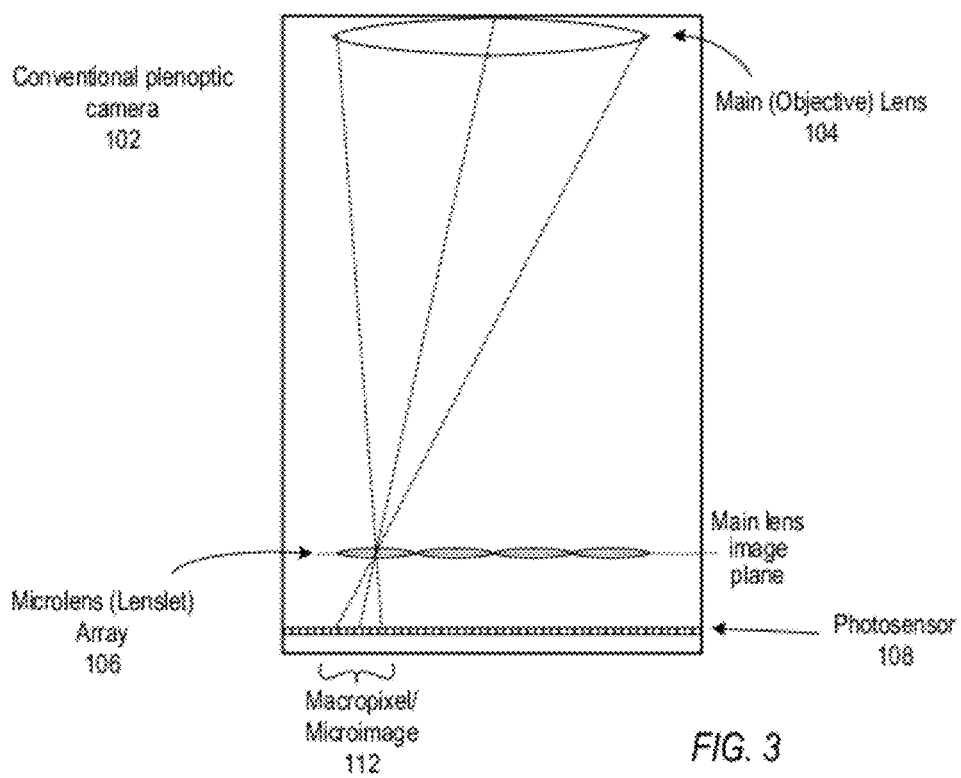
FIG. 3 illustrates an example prior art plenoptic camera that employs a single objective lens and a microlens array.
Figure 4:
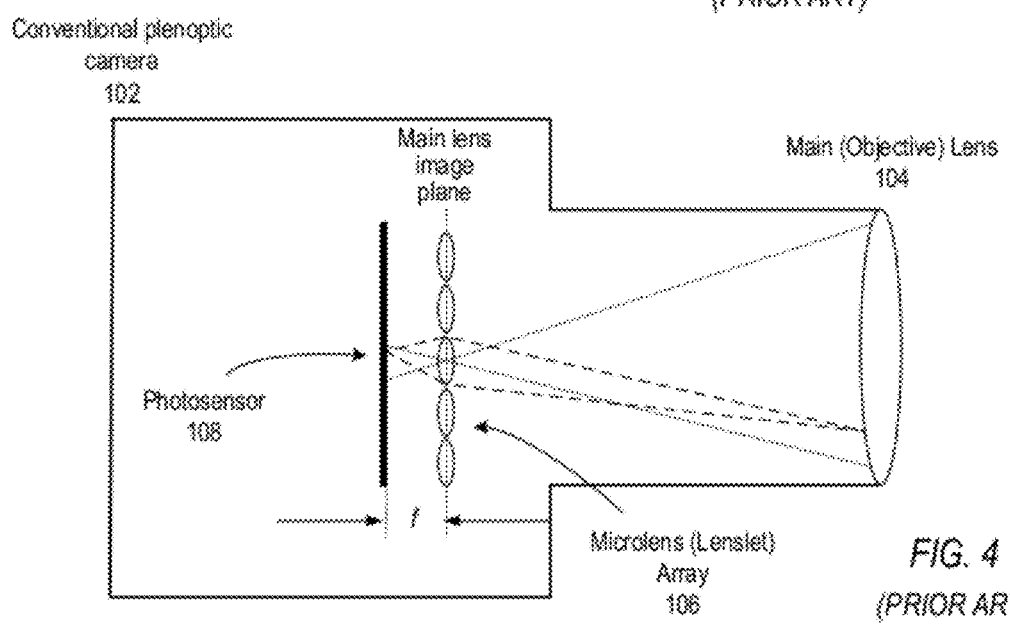
FIG. 4 further illustrates an example prior art plenoptic camera.

Various embodiments of a focused plenoptic camera are described. In conventional plenoptic cameras such as those illustrated in FIGS. 3 and 4, the microlenses are placed and adjusted accurately to be exactly at one focal length f from the photosensor, where f is the focal length of the microlenses. In addition, in conventional plenoptic cameras, the microlens array is fixed at the image plane of the main or objective lens of the camera, and the microlenses in the array are focused at infinity. In contrast, in embodiments of the focused plenoptic camera described herein, in order to increase or maximize spatial resolution, i.e., to achieve sharper, higher spatial resolution, microlens images, the microlenses are focused on the image created by the main lens inside the camera and in front of the microlenses (the image plane of the main lens), instead of being focused on the main lens itself, as in conventional plenoptic cameras. In further contrast to conventional plenoptic cameras, the microlenses in embodiments of the focused plenoptic camera described herein may be located at, or may be moved to, distances greater than for less than f from the photosensor, where f is the focal length of the microlenses. In one embodiment, the array of microlenses may be placed at distance ⅘ f from the photosensor. Other embodiments may place the array of microlenses at other distances that are multiples of f e.g. 1.5 f or ¾ f. In addition, embodiments of focused plenoptic cameras in which the distance of the microlens array from the photosensor is variable or adjustable, and in which other characteristics of the camera may be adjustable, are described. For example, in one embodiment, the distance of the microlens array from the photosensor may be adjustable within the range 0.5 f to 1.5 f. For the Keplerian telescopic case (the distance of the microlens array from the photosensor >f), a maximum useful distance may be 1.5 f, although distances greater than 1.5 f may be possible, if not practical. Thus, for the Keplerian telescopic case, a practical range for the distance of the microlens array from the photosensor may be f<b≦1.5 f.

Various embodiments of the focused plenoptic camera implemented in digital cameras and in film cameras are anticipated, and example embodiments of both types are described. In digital cameras, the photosensor is a digital light-capturing device or medium such as a charge-coupled device (CCD) that captures and records the light in digital format. In film cameras, the photosensor is a film. Thus, "photosensor" as used herein refers to digital media that are used in digital cameras to capture light and to film media that are used in film cameras to capture light, and more generally to any device or medium that may be used to capture light. Light-field images captured on a film using film camera embodiments may subsequently be digitized, for example using a high-resolution scanner, so that the captured light-field may be rendered, for example using the full-resolution light-field rendering method described herein, to produce high-resolution output images. Light-field images captured using digital camera embodiments may be directly rendered.

In addition to digital and film embodiments, fixed and adjustable embodiments of both digital camera and film camera embodiments of the focused plenoptic camera are anticipated, and example embodiments of both types are described. In a fixed embodiment, the photosensor and the microlens array are at a fixed distance b from each other (the distance b is a multiple of f, for example ⅘ f ¾ f, or 1.5 f, where f is the focal length of the microlenses). Note that b is used herein to designate the distance between the microlenses and the photosensor, while a is used herein to designate the distance between the microlenses and the image plane of the main or objective lens. In some embodiments, the microlens array/photosensor combination may be fixed at a location in the camera body. In some embodiments, the microlens array may be fixed in optical characteristics as well as in its physical location. In some embodiments, the main lens of the camera may also be fixed in optical characteristics and location, while possibly allowing for changes in shutter speed, aperture, focusing, etc. In adjustable embodiments, various manual or automatic mechanisms may be employed to change the distance b between the photosensor and the microlens array, to change the location of the microlens array/photosensor combination in the camera body, to change the distance from the main lens to the microlens array, to change the distance a between the microlenses and the image plane, and/or to swap or replace various components such as the microlens array and the main lens. In addition, the main lens of the camera may be swappable to use different main lenses, and may be adjustable according to aperture, shutter speed, focusing, distance from the microlens array, and so on. Embodiments where the microlens array may be swappable, so that microlens arrays with different numbers of microlenses and/or microlenses with different optical characteristics may be used, are also possible.

The optical characteristics of the optical system, including the optical characteristics of the lenses and the distances between the various components or elements, is important in capturing light-fields that may be rendered to yield high-resolution output images as described herein. Thus, in fixed embodiments, the microlenses, main lens, photosensor, and the relative physical location of these components in the camera may be determined according to the formulas and equations described herein to capture appropriate and satisfactory light-field images. In adjustable embodiments, some embodiments may include automated mechanisms that automatically adjust the positioning or other aspects of one or more of the components to capture appropriate and satisfactory light-field images. For example, if the user adjusts or replaces one component, the camera may automatically adjust one or more other components to compensate for the change. Alternatively, a human operator of an adjustable focused plenoptic camera may manually adjust the positioning or other aspects of one or more of the components, may replace one or more components with units that have different characteristics, or may insert other components (e.g., microsheet glass, as described below) to capture appropriate and satisfactory light-field images.

Figure 6:
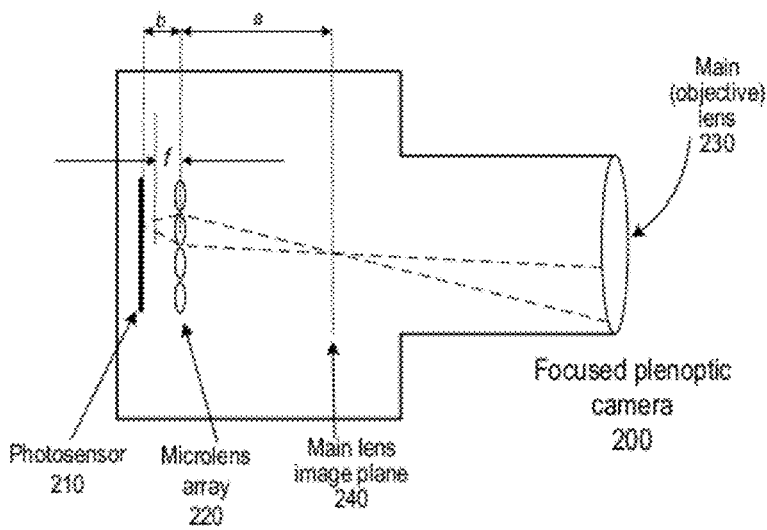
FIG. 6 is a block diagram illustrating a focused plenoptic camera according to one embodiment.
Figure 7:
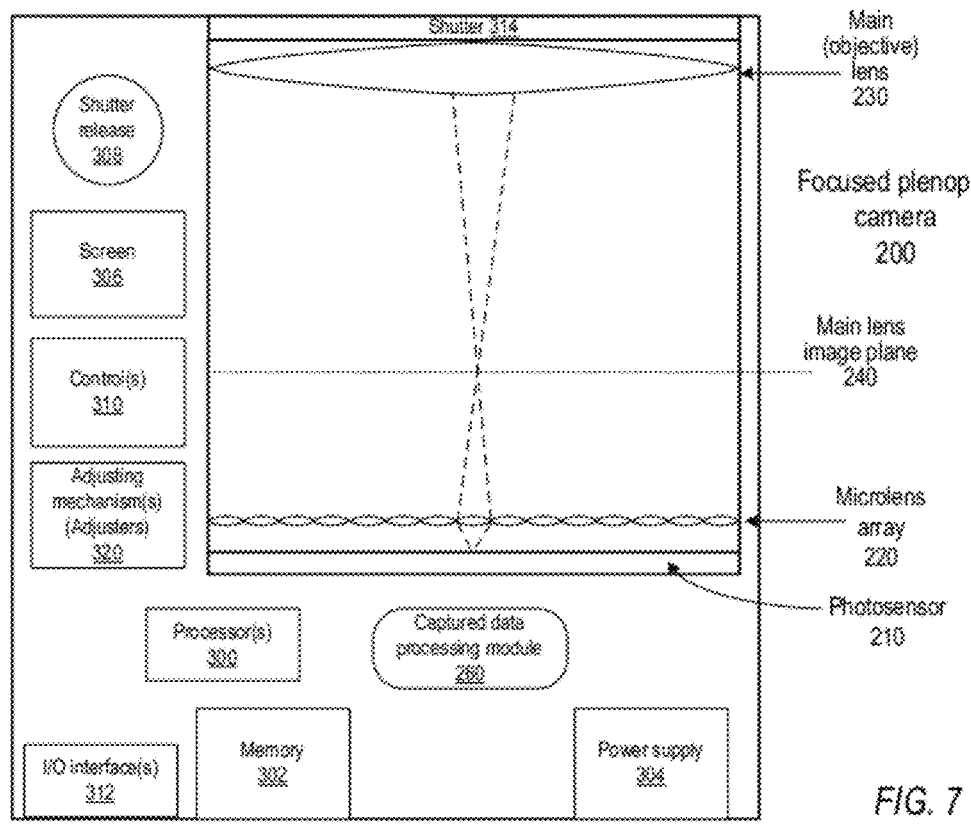
FIG. 7 illustrates an example embodiment of a focused plenoptic camera with various other elements that may be integrated in the camera.
Figure 8:
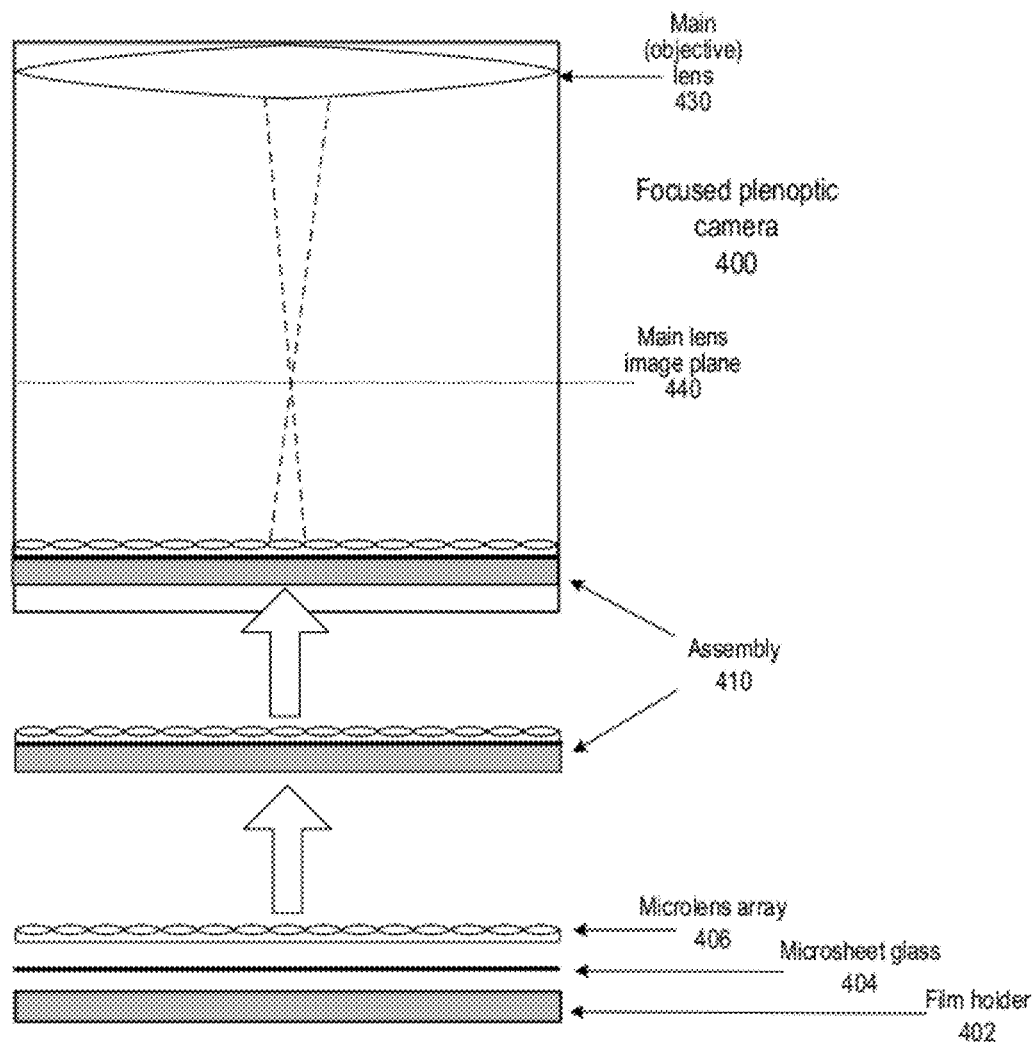
FIG. 8 illustrates an example embodiment of a focused plenoptic camera based on a large-format film camera.

FIGS. 6 through 8 illustrate example film camera and digital camera embodiments of a focused plenoptic camera as described herein, and further illustrate both fixed and adjustable embodiments of the focused plenoptic camera. It is noted that these are example embodiments, and are not intended to be limiting. Other embodiments are possible and anticipated.

FIG. 6 is a block diagram illustrating a focused plenoptic camera according to one embodiment. Focused plenoptic camera 200 may include a main (objective) lens 230, a microlens array 220, and a photosensor 210. Microlens array 220 may be located at a distance greater than f from photosensor 210, where f is the focal length of the microlenses in array 220. In addition, the microlenses in array 220 are focused on the image plane 240 of the main lens 230. In contrast, in conventional plenoptic cameras such as plenoptic camera 102 of FIGS. 3 and 4, the microlens array 106 is fixed at distance f from photosensor 108, and the microlenses in array 106 are focused on the main lens 104. In some embodiment, photosensor 210 may be conventional film; in other embodiments, photosensor 210 may be a device for digitally capturing light, for example a CCD. In one embodiment of a microlens array 220 that may be used in embodiments of focused plenoptic camera 200, or in other embodiments as illustrated in FIGS. 7 and 8, the microlens array 220 may include 146,000 microlenses of diameter 0.25 mm and focal length 0.7 mm. Other configurations of microlens array 220, including different numbers of microlenses and/or microlenses with different optical characteristics, are possible and anticipated. FIG. 16 shows a zoom into an example microlens array, and shows individual microlenses and (black) chromium mask between the microlenses.

FIG. 7 illustrates an example embodiment of focused plenoptic camera 200 with various other elements that may be integrated in the camera 200. In some embodiments of focused plenoptic camera 200, the objective lens 230, the microlens array 220, and the photosensor 210 may be fixed. In other embodiments, one or more of the above elements may be replaceable and/or adjustable. In some embodiment, photosensor 210 may be conventional film; in other embodiments, photosensor 210 may be a device for digitally capturing light, for example a CCD. In general, embodiments of a focused plenoptic camera 200 as described herein may include, in addition to main lens 230, microlens array 220, and photosensor 210, any other type of elements and features commonly found in digital cameras or other cameras including light-field and plenoptic cameras and large-format film cameras, and may also include additional elements and features not generally found in conventional cameras.

Figure 24:
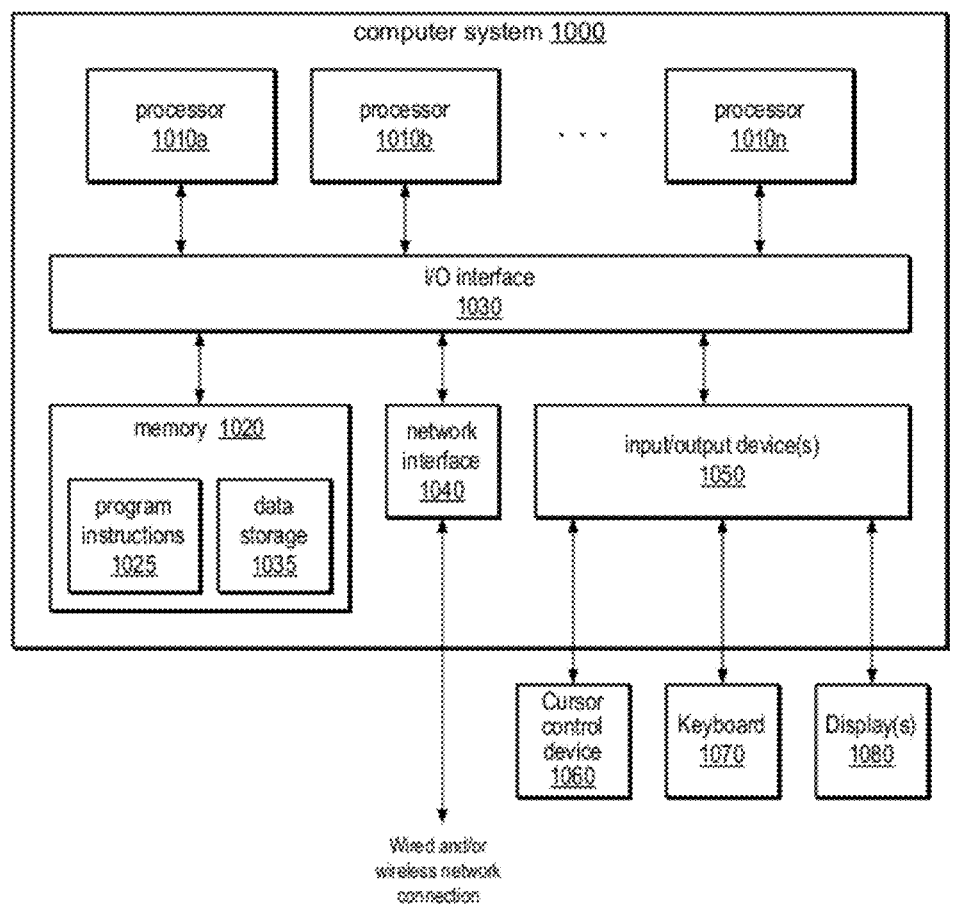
FIG. 24 illustrates an example computer system that may be used in embodiments.

In one embodiment, a full-resolution light-field rendering method for rendering high-resolution images from light-fields captured by focused plenoptic camera 200, and/or other image processing algorithms for application to light-fields captured by embodiments of focused plenoptic camera 200, may be implemented in captured data processing module 260. Captured data processing module 260 may be implemented in hardware, software, or a combination thereof. Alternatively, light-fields captured by focused plenoptic camera 200 may be rendered according to the full-resolution light-field rendering method implemented in a rendering module executing on a separate device, e.g. a computer system, to generate one or more high-resolution output images of a captured scene, as described herein. An example computer system in which embodiments of the full-resolution light-field rendering method may be implemented is illustrated in FIG. 24.

A focused plenoptic camera 200 may include a shutter 314. Shutter 314 may be located in front of or behind objective lens 230. A focused plenoptic camera 200 may include one or more processors 300. A focused plenoptic camera 200 may include a power supply or power source 304, such as one or more replaceable or rechargeable batteries. A focused plenoptic camera 200 may include a memory storage device or system 302 for storing captured light-field images and/or rendered final images or other information such as software. In one embodiment, the memory 302 may be a removable/swappable storage device such as a memory stick. A focused plenoptic camera 200 may include a screen 306 (e.g., an LCD screen) for viewing scenes in front of the camera prior to capture and/or for viewing previously captured and/or rendered images. The screen 306 may also be used to display one or more menus or other information to the user. A focused plenoptic camera 200 may include one or more I/O interfaces 312, such as FireWire or Universal Serial Bus (USB) interfaces, for transferring information, e.g. captured light-field images, software updates, and so on, to and from external devices such as computer systems or even other cameras. A focused plenoptic camera 200 may include a shutter release 308 that is activated to capture a light-field image of a subject or scene.

A focused plenoptic camera 200 may include one or more controls 310, for example controls for controlling optical aspects of the focused plenoptic camera 200 such as shutter speed, one or more controls for viewing and otherwise managing and manipulating captured images stored in a memory on the camera, etc. An adjustable focused plenoptic camera 200 may include one or more controls for adjusting the relative location of (the distance between) the components in the camera 200, such as the distance b between microlens array 220 and photosensor 210. An adjustable focused plenoptic camera 200 may include one or more manual or automatic adjusting mechanism(s) 320, or adjusters, configured to adjust the relative location of (the distance between) the components in the camera 200, such as the distance b between microlens array 220 and photosensor 210. In some embodiments, the adjusting mechanisms 320 may act to adjust one or more components responsively to controls 310.

FIG. 8 illustrates an example embodiment of a focused plenoptic camera based on a large-format film camera. In conjunction with current high-resolution scanners used to digitize captured images from negatives or prints, large-format film camera embodiments are capable of up to 1 gigapixel, or even higher, resolution for the flat (a flat is a 2D representation of the 4D radiance). An example embodiment may, for example, be implemented in large-format film camera using a 135 mm objective lens 430 and 4×5 format film as the "photosensor" (in large-format cameras, single negatives of film are generally placed in a film holder 402 or cartridge that can be inserted into and removed from the camera body). Other objective lenses and/or other film formats, for example 8×10 format film, may be used in various embodiments. Focused plenoptic camera 400 includes a microlens array 406. FIG. 16 shows a zoom into an example microlens array, and shows individual microlenses and (black) chromium mask between the microlenses. In one embodiment of a microlens array that may be used in embodiments of focused plenoptic camera 400, or in other embodiments as illustrated in FIGS. 6 and 7, the microlens array 406 may include 146,000 microlenses of diameter 0.25 mm and focal length 0.7 mm. Other configurations of microlens array 406, including different numbers of microlenses and/or microlenses with different optical characteristics, are possible and anticipated.

In one embodiment, a mechanism inside a film holder 402 of the large-format film camera holds the microlens array 406 so that the flat side of the glass base of the array 406 is pressed against the film. In one embodiment, the thickness of the microlens array 406 is such that, when placed against the film, the microlenses are distance f from the film. Other configurations of microlens arrays 406 are possible, and the configuration of the large-format film camera makes it possible to easily change configurations of microlenses by simply using a different microlens array 406. Microsheets 404 of glass may be used in the assembly as spacers or shims between the microlens array 406 and the film in film holder 402 to increase the distance from the microlenses and the film to be greater than f (e.g., 4/3 f). An example thickness of a microsheet 404 that may be used is 0.23 mm. Inserting microsheet glass 404 provides spacing in a rigorously controlled manner. In one embodiment, additional spacing may be created by adding a single microsheet 404 between the film holder 402 and the microlens array 406 in order to displace the microlenses by an additional 1/3 f, approximately 0.2 mm from the sensor. Additional microsheets 404 may be added to provide additional spacing. In some embodiments, other mechanisms than microsheet glass may be used as spacers between the microlens array 406 and film holder 402 to adjust the distance between the microlens array 406 and film holder 402.

As illustrated in FIG. 8, in one embodiment, the film holder 402 and microlens array 406 may be coupled to create assembly 410. One or more microsheets 404 may optionally be inserted between the film holder 402 and microlens array 406 to provide additional spacing as necessary or desired. The assembly 410 may then be inserted into the large-format film camera. The combination of the large-format film camera and the assembly 410 effectively forms a focused plenoptic camera 400. Focused plenoptic camera 400 may then be used to capture a flat of a scene on the film in film holder 402. A flat is a 2D representation of the 4D light-field. The assembly 410 may then be removed from the camera 400, disassembled, and the film may be appropriately processed. The film negative and/or a print of the flat may then be digitized, for example using a high-resolution scanner or a device that generates digital images from negatives. The digitized flat may be stored to a storage device, such as a disk drive, DVD, CD, etc. The digitized flat may be rendered according to the full-resolution light-field rendering method, implemented in a rendering module executing on a computer system, to generate one or more high-resolution output images of the scene as described herein. An example computer system in which embodiments of the full-resolution light-field rendering method may be implemented is illustrated in FIG. 24.

An analysis of the full-resolution light-field rendering methods and apparatus provided herein shows that focusing the microlenses on the image plane of the main lens in the focused plenoptic camera, rather than focusing on the main lens itself as in conventional plenoptic cameras, enables embodiments of the full-resolution light-field rendering methods and apparatus to more fully exploit positional information available in the captured flat (i.e., the 2D representation of the 4D light-field) captured by the light-field camera). Based on good focusing and high-resolution of the microlens images, embodiments of the described methods and apparatus are able to achieve very high-resolution of rendered images when compared to conventional plenoptic cameras and conventional rendering methods. For example, one embodiment achieves a 27× increase in resolution in each spatial dimension when compared to results from conventional plenoptic cameras and conventional rendering methods.

Full-Resolution Light-Field Rendering Method

Embodiments of a method and apparatus for rendering high-resolution images from a light-field, for example captured by embodiments of the focused plenoptic camera, are described. The method for rendering high-resolution images from the light-field may be referred to as a full-resolution light-field rendering method. The light-field rendering method may be referred to as full-resolution because the method makes full use of both positional and angular information available in the captured radiance data. The full-resolution light-field rendering method may be implemented as or in a tool, module, library function, plug-in, stand-alone application, etc. For simplicity, implementations of embodiments of the full-resolution light-field rendering method may be referred to as a rendering module. Alternatively, or in addition, other light-field rendering or processing techniques may be applied to captured flats by a rendering module, and/or by other modules. FIG. 24 illustrates an example computer system on which embodiments of a rendering module may be implemented.

A description of the full-resolution light-field rendering method and an analysis of the limits and tradeoffs of the method are presented. The effectiveness of the full-resolution light-field rendering method when compared to conventional methods may be demonstrated experimentally by rendering images from a 542-megapixel light-field using a conventional rendering approach and using the full-resolution light-field rendering method described herein. In the experiments, the conventional rendering methods produce a 0.146-megapixel final image, while the full-resolution light-field rendering method produces a 106-megapixel final image. Experimental results show that our method may produce full-resolution images that approach the resolution that would have been captured directly with a conventional (non-light-field) high-resolution camera.

Plenoptic Camera Modes of Behavior

The full-resolution light-field rendering method may be derived by analyzing the optical system of the plenoptic camera. First, some observations of captured flats, which are 2D representations of the 4D light-field, are presented, and these observations are used to motivate the subsequent analysis.

Figure 9:
FIG. 9 shows an example crop from a flat captured with a plenoptic camera.

FIG. 9 shows an example crop from a raw flat captured with a plenoptic camera. In FIG. 9, repeated edges inside multiple circles may be observed. Each microlens in the microlens array creates a microimage; the resulting flat is thus an array of microimages. On a large scale, the overall image may be perceived, whereas the correspondence between the individual microlens images and the large scale scene is less obvious. Interestingly, as will be shown, it is this relationship—between what is captured by the microlenses and what is in the overall scene—that may be exploited in embodiments to create high-resolution images.

In FIG. 9, on a small scale, a number of clearly distinguishable features inside the circles, such as edges, may be observed. Edges are often repeated from one circle to the next. The same edge (or feature) may be seen in multiple circles, in a slightly different position that shifts from circle to circle. If the main camera lens is manually refocused, a given edge can be made to move and, in fact, change its multiplicity across a different number of consecutive circles.

Repetition of features across microlenses is an indication that that part of the scene is out of focus. When an object from the large-scale scene is in focus, the same feature appears only once in the array of microimages.

In interpreting the microimages, it is important to note that, as with the basic conventional camera described above, the operation of a basic plenoptic camera is far richer than a simple mapping of the radiance function at some plane in front of the main lens onto the sensor. That is, there are an essentially infinite number of mappings from the scene in front of the lens onto the image sensor. For one particular distance, this corresponds to a mapping of the radiance function. What the correspondence is for parts of the scene at other distances—as well as how they manifest themselves at the sensor—is less obvious. This will be the topic of the remaining part of this section.

Next, two limiting cases are considered which can be recognized in the behavior of the plenoptic camera: Keplerian telescopic (where the distance between the photosensor and the microlens array, b, is greater than the focal length f of the microlenses in the array) and Galilean telescopic (also referred to as binocular) (where b is less than f). Neither of those cases is exact for a true plenoptic camera, but their fingerprints can be seen in every plenoptic image. As will be show, both are achievable, and are very useful.

Plenoptic Camera: Keplerian Telescopic Case

Figure 10:
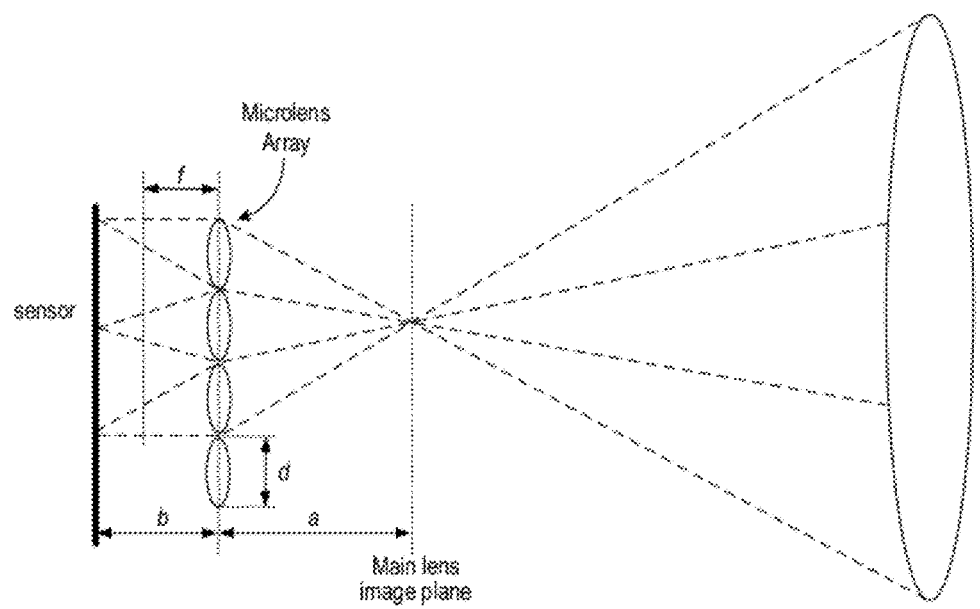
FIG. 10 illustrates the Keplerian telescopic case for a plenoptic camera.

FIG. 10 illustrates the Keplerian telescopic case (b>f) for a plenoptic camera. A plenoptic camera may be considered as an array of (Keplerian) telescopes with a common objective lens. (For the moment the issue of microlenses not being exactly focused for that purpose will be ignored.) Each individual telescope in the array has a microcamera (an eyepiece lens and the eye) inside the big camera. Just like any other camera, this microcamera is focused onto one single plane, and maps the image from the plane onto the retina, inverted and reduced in size. A camera can be focused only for planes at distances ranging from f to infinity (∞) according to the lens equation:

$$\frac{1}{a} + \frac{1}{b} = \frac{1}{f}$$

Here, a, b, and f have the same meaning as for the big camera, except on a smaller scale. It can be seen that since a and b must be positive, it is not possible to focus closer than f. In a conventional plenoptic camera, the image plane is fixed at the microlenses. It may be more natural to consider the image plane fixed at distance f in front of the microlenses. In both cases, microimages are out of focus.

Figure 11:
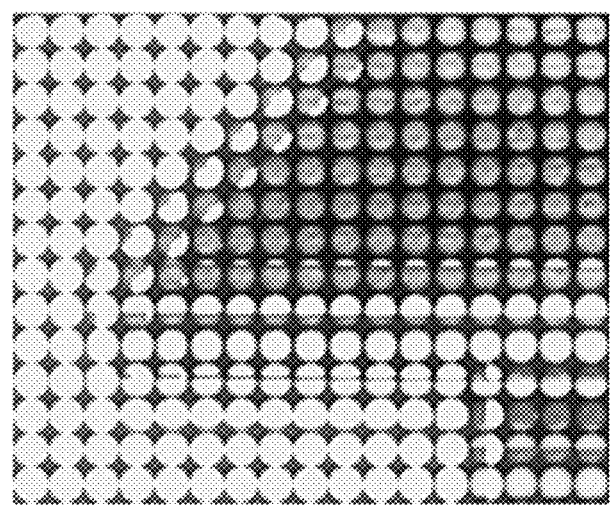
FIG. 11 shows a crop from the roof area in FIG. 9, and visually illustrates the Keplerian telescopic behavior in light-field cameras.

Following the movement of an edge from circle to circle, characteristic behavior of Keplerian telescopic imaging in the flat may be observed. FIG. 11 shows a crop from the roof area in FIG. 9. FIG. 11 may be used to visually illustrate the Keplerian "telescopic" behavior. It is possible to observe in FIG. 11 that the edge is repeated two times when moving away from the roof. The farther from the roof a circle is, the farther the edge appears inside that circle. Moving in any given direction, the edge moves relative to the circle centers in the same direction. Once detected in a given area, this behavior is consistent (valid in all directions in that area). Careful observation shows that images in the small circles are indeed inverted patches from the high-resolution image, as if observed through a telescope.

For the Keplerian telescopic case, a practical range for b may be $f < b \leq 1.5 f$.

Plenoptic Camera: Galilean Telescopic (Binocular) Case

Figure 12:
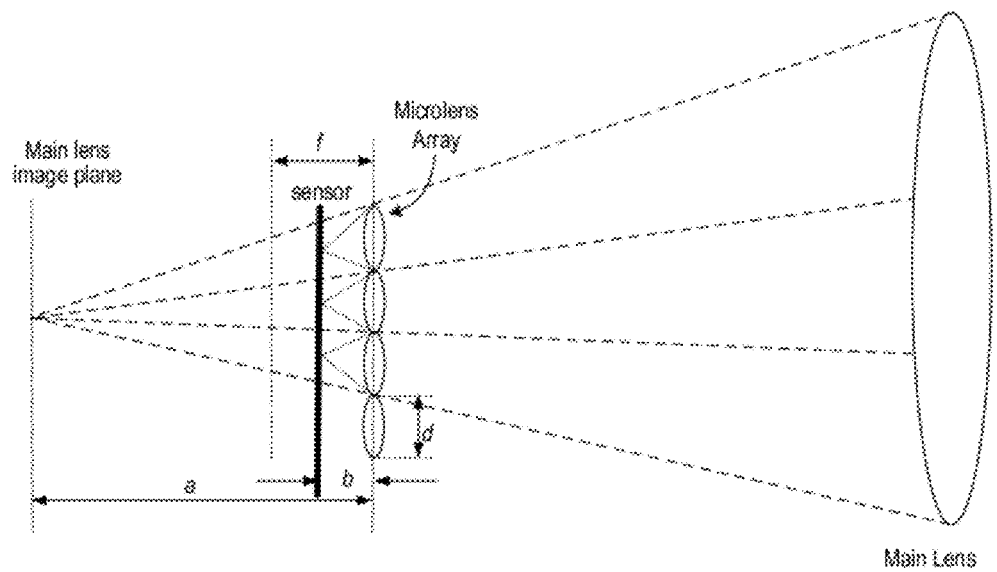
FIG. 12 illustrates the Galilean telescopic case for a plenoptic camera.
Figure 13:
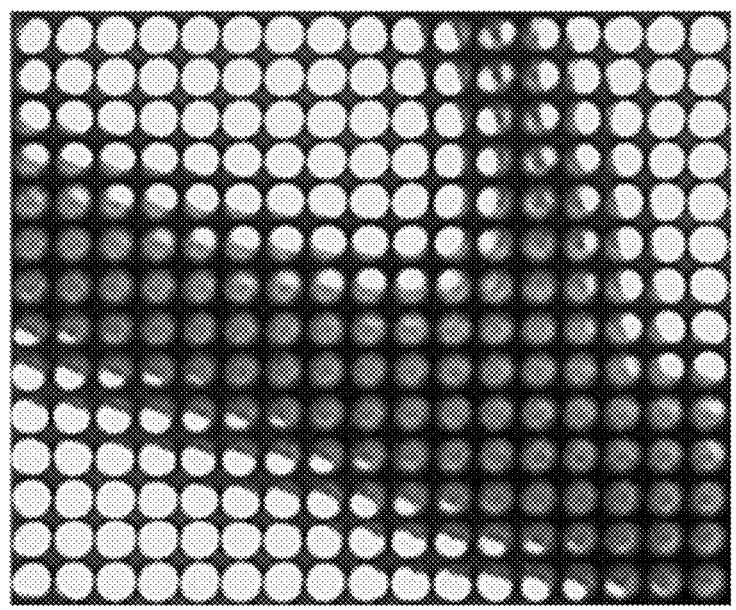
FIG. 13 shows a crop from the tree area in FIG. 9, and visually illustrates the Galilean telescopic behavior in light-field cameras.

FIG. 12 illustrates the Galilean telescopic, or binocular, case (b<f) for a plenoptic camera. FIG. 13 shows a crop from the tree area in FIG. 9, and is used to illustrate details of Galilean telescopic imaging in light-field cameras. Note that the image is not inverted in FIG. 13. A plenoptic camera may also be considered as an "incompletely focused" camera, i.e., a camera focused behind the film plane (as in a Galilean telescope and in binoculars). If an appropriate positive lens is placed in front of the film, the image would be focused on the film. For a Galilean telescope, this is the lens of the eye that focuses the image onto the retina. For a plenoptic camera, this role is played by the microlenses with focal length f. In the Galilean telescopic case, the microlenses would need to be placed at a distance smaller than f from the film. Note also that while the Keplerian telescopic operation inverts the inside image, the Galilean telescopic operation does not invert it.

As with Keplerian telescopic imaging, characteristic behavior of Galilean telescopic imaging can be observed in the plenoptic camera. See FIG. 13, which is a crop from the top left corner in FIG. 9. In FIG. 13, it can be observed that edges are repeated about two or three times when moving away from the branch. The farther from the branch, the closer to the branch the edge appears inside the circle. Moving in any given direction, the edge moves relative to the circle centers in the opposite direction. Once detected in a given area, this behavior is consistent (valid in all directions in that area). This is due to the depth in the image at that location. Careful observation shows that images in the small circles are in fact patches from the corresponding area in the high-resolution image, only reduced in size. The more times the feature is repeated in the circles, the smaller it appears and thus a bigger area is imaged inside each individual circle.

To summarize, an approximately focused plenoptic camera (i.e., a plenoptic camera where b≠1) may be considered as an array of microcameras looking at an image plane in front of the array or behind the array. Each microcamera images only a small part of that plane. The shift between those small images is obvious from the geometry, as explained below in the section titled Analysis. If at least one microcamera could image this entire plane, it could directly capture a high-resolution image. However, the small images are limited in size by the main lens aperture.

The magnification of these microcamera images, and the shift between them, is defined by the distance to the image plane. This distance can be at positive or negative distance from the microlenses, corresponding to the Keplerian telescopic (positive) and Galilean telescopic (negative) cases described above. By slightly adjusting the plane of the microlenses (so that the lenses are in focus), embodiments can make use of the Keplerian telescopic or Galilean telescopic behavior to generate a high-resolution image from the flat. This process is described in the following sections.

Analysis

In some embodiment, microlenses may not be focused exactly on the plane that is to be imaged, causing the individual microlens images to be blurry. This may limit the amount of resolution that can be achieved. One way to improve such results would be deconvolution. Another way would be to stop down the microlens apertures.

In FIGS. 14A and 14B, the case of a "plenoptic" camera using a pinhole array instead of microlens array is considered. In FIGS. 14A and 14B, an array of pinholes (or microlenses) maps the image in front of the array to the sensor. The distance to the image defines the magnification factor M=n−1. In ray optics, in theory, pinhole images produce no defocus blur, and in this way are perfect. But this is in theory; in the real world, pinholes are replaced with finite but small apertures and microlenses.

From the lens equation:

$$\frac{1}{a} + \frac{1}{b} = \frac{1}{f}$$

it can be seen that, if the distance to the object is a=nf, the distance to the image would be:

$$b = \frac{nf}{n-1}$$

$$n = \frac{b}{b-f}$$

The geometric magnification factor may be defined as M=a/b, which by substitution gives:

$$M = n-1$$

FIG. 14A shows the ray geometry in the Keplerian telescopic case for n=4, and FIG. 14B shows the ray geometry in the Keplerian telescopic case for n=2. Note that the distance b from the microlenses to the sensor is always greater than f (this is not represented in FIGS. 14A and 14B). Looking at the geometry in FIGS. 14A and 14B, the images are M times smaller, inverted, and repeated M times.

Full-Resolution Light-Field Rendering Algorithm

Two distinct behaviors (Keplerian telescopic and Galilean telescopic) are described above, and embodiments of the full-resolution light-field rendering method may execute a different action based on which behavior is observed in the microimages contained in the flat captured by a focused plenoptic camera. In one embodiment, if the full-resolution light-field rendering method detects edges (or features) moving relative to the microimage centers (the microimages are generally circular, so may be referred to as circles) in the same direction as the direction of movement, all microimages in that area are inverted relative to their individual centers (this is the Keplerian telescopic case). If the full-resolution light-field rendering method detects edges moving relative to the microimage centers in a direction opposite to the direction of movement, the method does nothing (this is the Galilean telescopic case). In some embodiments, examination of the microimages to determine the direction of movement of edges may be performed by a user via a user interface. The user may mark or otherwise indicate areas that the user determines need be inverted via the user interface. In some embodiments, examination of the microimages to determine the direction of movement of edges may be performed automatically in software.

The small circles, or microimages, in a flat are, effectively, puzzle pieces of the big image, and embodiments of the full-resolution light-field rendering method reproduce the big image by bringing the microimages sufficiently close together. The big image may also be reproduced by enlarging the pieces so that features from any given piece match those of adjacent pieces. Assembling the resized pieces reproduces exactly the high-resolution image.

In either of these approaches, the individual pieces may overlap. FIG. 15 illustrates a lens circle (or microimage) of diameter D and a patch of size $m_1 \times m_2$, where at least one of $m_1$ and $m_2$ is an integer greater than or equal to 2. Some embodiments of the full-resolution light-field rendering method avoid this overlapping by dropping all pixels outside a square of size $m_1 \times m_2$, effectively cropping the microimage to an $m_1 \times m_2$ square. Note that other embodiments may crop to other geometric shapes, such as a rectangle.

Conventional rendering methods do not reassemble pixels as described above; the conventional plenoptic camera algorithm produces one pixel per microlens for the output image. Embodiments of the full-resolution light-field rendering method, using the algorithm described above, produce a gain in resolution that is approximately equal to the number of pixels $m_1 \times m_2$ in the original patches. That is, embodiments produce $m_1 \times m_2$ pixels, instead of one pixel, per microimage It has been shown above that the magnification M=n−1. It is also the case that M=D/m. It therefore follows that:

$$n = 1 + \frac{D}{m}$$

From the above, the distance (measured in number of focal lengths) to the image plane in front of the microlens is related to D and m.

It is important to note that lenses produce acceptable images even when they are not exactly in focus. Additionally, out of focus images can be deconvolved, or simply sharpened. For those reasons, the above analysis is actually applicable for a wide range of locations of the image plane. Even if not optimal, such a result is often a useful tradeoff.

The optics of the microlens as a camera is the main factor in determining the quality of each microimage. Blurry images from optical devices may be deconvolved and the sharp image recovered to some extent. In order to do this, the effective kernel of the optical system should be known. While there are limitations in this related to bit depth and noise, embodiments may increase resolution up to $m_1 \times m_2$ times the resolution of a conventional plenoptic camera and conventional rendering method. Example embodiments have demonstrated a 27× increase of resolution in one plane, and a 10× increase of resolution in another plane, when compared to conventional methods and apparatus, and without any deconvolution. Other embodiments may yield other increases in resolution when compared to conventional methods and apparatus.

Example Results

Some embodiments of a focused plenoptic camera as described herein may be implemented in film cameras. Embodiments may, for example, be implemented in large-format film cameras. An example large-format film camera embodiment is illustrated in FIG. 8. One example embodiment may, for example, be implemented in large-format film camera using a 135 mm objective lens and 4×5 format film. A focused plenoptic camera based on a large-format film camera rather than on a digital camera may be used for experimental purposes in order to avoid resolution constraint of digital sensors. However, film camera embodiments of the focused plenoptic camera design are practical and may have practical applications. In conjunction with current high-resolution scanners used to digitize captured images from negatives or prints, large-format film camera embodiments are capable of 1 gigapixel, or even higher, resolution for the flat (2D) representation of the 4D radiance (the raw flat).

A component of the focused plenoptic camera is a microlens array. FIG. 16 shows a zoom into an example microlens array, and shows individual microlenses and (black) chromium mask between the microlenses. In one embodiment of a microlens array that may be used in the example embodiment based on a large-format film camera, the microlens array includes 146,000 microlenses of diameter 0.25 mm and focal length 0.7 mm. A mechanism inside a 4×5 inch film holder of the large-format film camera holds the microlens array so that the flat side of the glass base is pressed against the film. In one embodiment, the thickness of the microlens array is such that, when placed against the film, the microlenses are distance f from the film. Other configurations of microlens arrays are possible, and the configuration of the large-format film camera makes it possible to easily change configurations of microlenses by simply using a different microlens array. Microsheets of glass may be used in the assembly as spacers or shims between the microlens array and the film to increase the distance from the microlenses and the film to be greater than f (e.g., 4⁄3 f). An example thickness of a microsheet that may be used is 0.23 mm. Inserting microsheet glass provides spacing in a rigorously controlled manner. In one embodiment, additional spacing may be created by adding a single microsheet between the film and the microlenses in order to displace the microlenses by an additional 1⁄3 f, approximately 0.2 mm from the sensor. Additional microsheets may be added to provide additional spacing.

Experiments may be conducted both with and without inserting microsheets of glass as spacers or shims between the microlens array and the film in the example film camera used for testing. In both cases, the focal length of the microlenses is f=0.700 mm. The spacing in two experimental conditions differ as follows:

b=0.71 mm so that n=71 and M=70, which is made possible directly by the thickness of glass of the microlens array assembly itself; and
  b=0.94 mm based on microsheet glass between microlens array and film. As a result, n=3.9 (almost 4) and M=3, approximately.

High-Resolution Rendering Methods and Results

FIGS. 17 through 20 are used to illustrate experimental results from applying the full-resolution rendering method to flats captured with the example focused plenoptic camera based on a large-format film camera described above. In particular, the operation of rendering in both the Keplerian telescopic case and the Galilean telescopic case is illustrated and described.

Figure 17:
FIG. 17 shows a portion of a digitized flat.

The original, unrendered flat was generated by capturing the image on film using the example focused plenoptic camera based on a large-format film camera, and digitizing the image via a scanning process using a high-resolution scanner. A portion of the digitized flat is shown in FIG. 17. After digitization, the full original flat is 24,862×21,818 pixels, of which 2,250×1,950 pixels are shown in FIG. 17. The approximate region of the original flat extracted to produce FIG. 17 is shown by small solid white rectangle in FIG. 18C.

Figure 18A:
FIGS. 18A through 18C show output images rendered from a flat using conventional rendering methods.
Figure 18B:
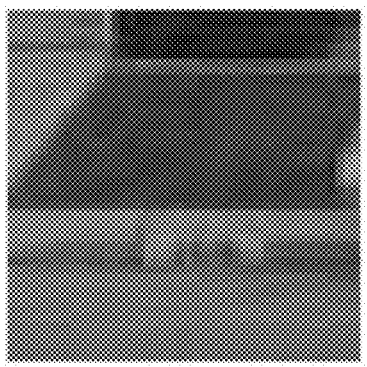
Figure 18C:
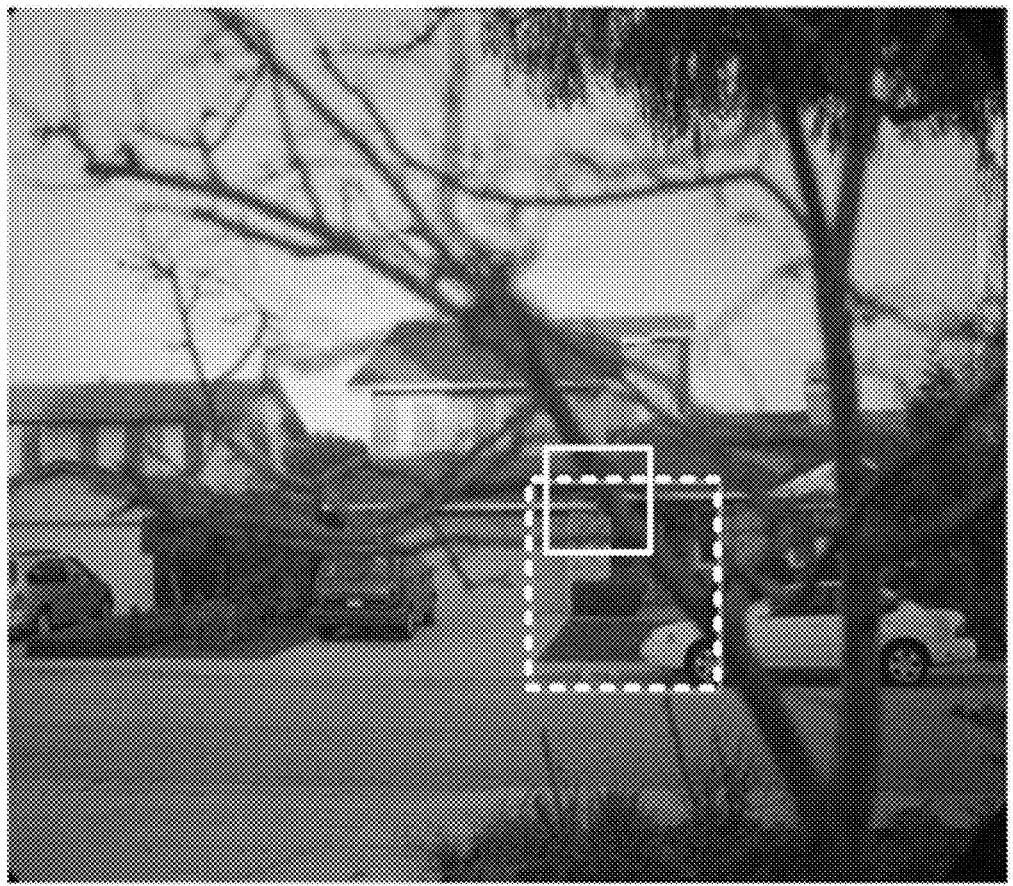

Output images rendered from the flat using conventional rendering methods are shown in FIGS. 18A through 18C. The entire flat was rendered with the conventional method, resulting in a 408×357 pixel image. FIG. 18A is rendered at 300 ppi, while FIG. 18C is rendered at 72 ppi. At 300 ppi, the image is only about 1 inch by 1 inch. FIG. 18B shows a 27× magnification of a crop of the curb area from the 300 ppi image in FIG. 18A. The solid white rectangle in FIG. 18C shows the region from the light-field shown in FIG. 17. The dashed white rectangle in FIG. 18C shows a region that is rendered according to an embodiment of the full-resolution light-field method as shown in FIGS. 19 and 20.

Figure 19:
FIG. 19 shows a full-resolution rendering of a light-field, rendered assuming the Keplerian telescopic case according to one embodiment of the full-resolution light-field rendering method.

FIG. 19 show a full-resolution rendering of the experimental light-field, rendered assuming the Keplerian telescopic case according to one embodiment of the full-resolution light-field rendering method described herein. This region of the image is shown by the dashed white rectangle in FIG. 18C. For this rendering, the scaling-down factor was taken to be approximately 2.4, so that the full-resolution rendered image measured 11016×9666, i.e., over 100 megapixels. Even though the image is at 300 dpi, only a 2,250×1,950 region is shown in FIG. 19. The image is well-focused at full-resolution in the region of the house, but not well-focused on the tree branches.

Figure 20:
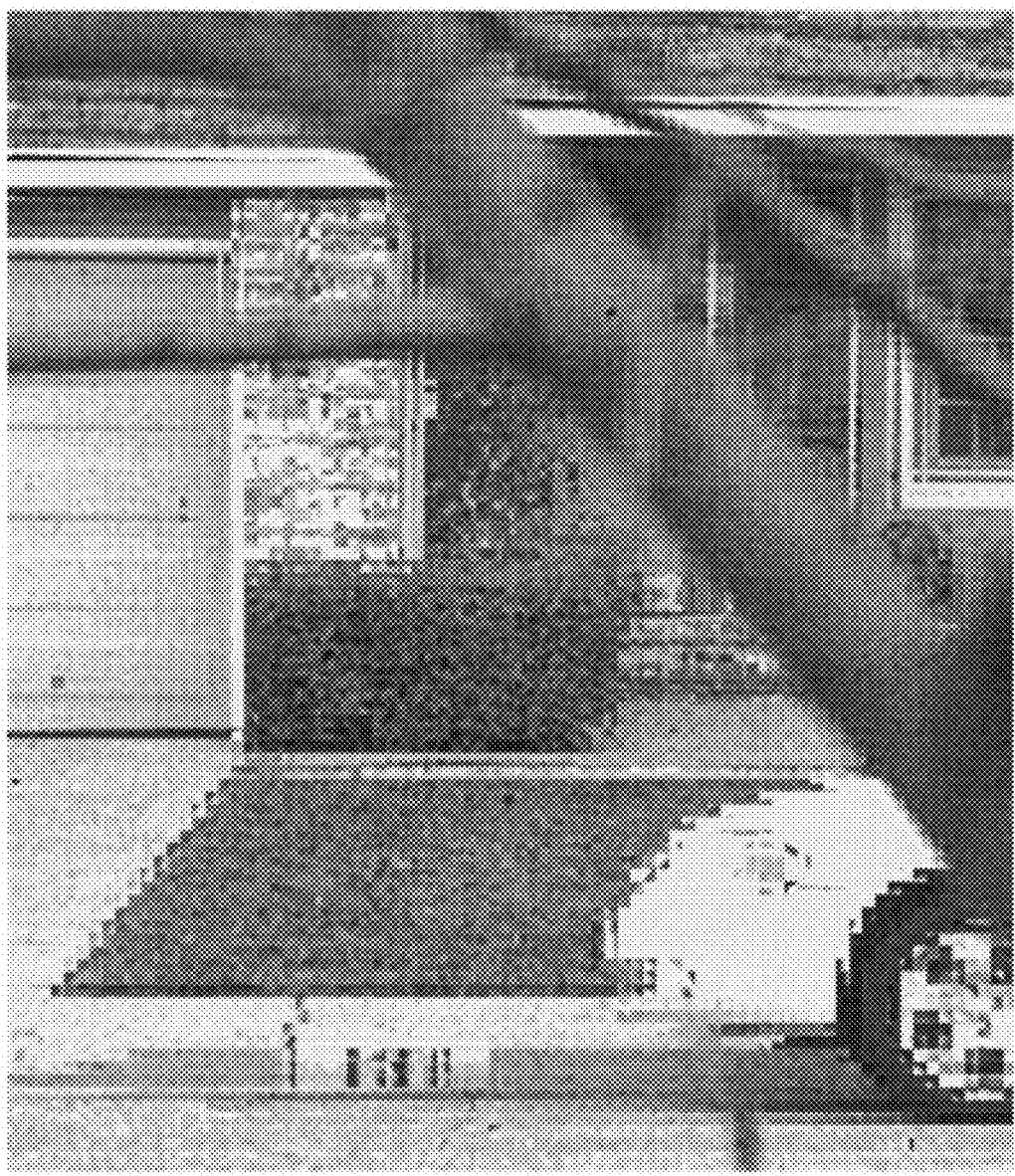
FIG. 20 shows a full-resolution rendering of a light-field, rendered assuming the Galilean telescopic case according to one embodiment of the full-resolution light-field rendering method.

FIG. 20 shows a full-resolution rendering of the experimental light-field, rendered assuming the Galilean telescopic case according to one embodiment of the full-resolution light-field rendering method described herein. This region of the image is shown by the dashed white rectangle in FIG. 18C. Note that, in contrast to the image in FIG. 20, this image is well-focused at full-resolution in the region of the tree branches but not well-focused on the house.

Figure 21:
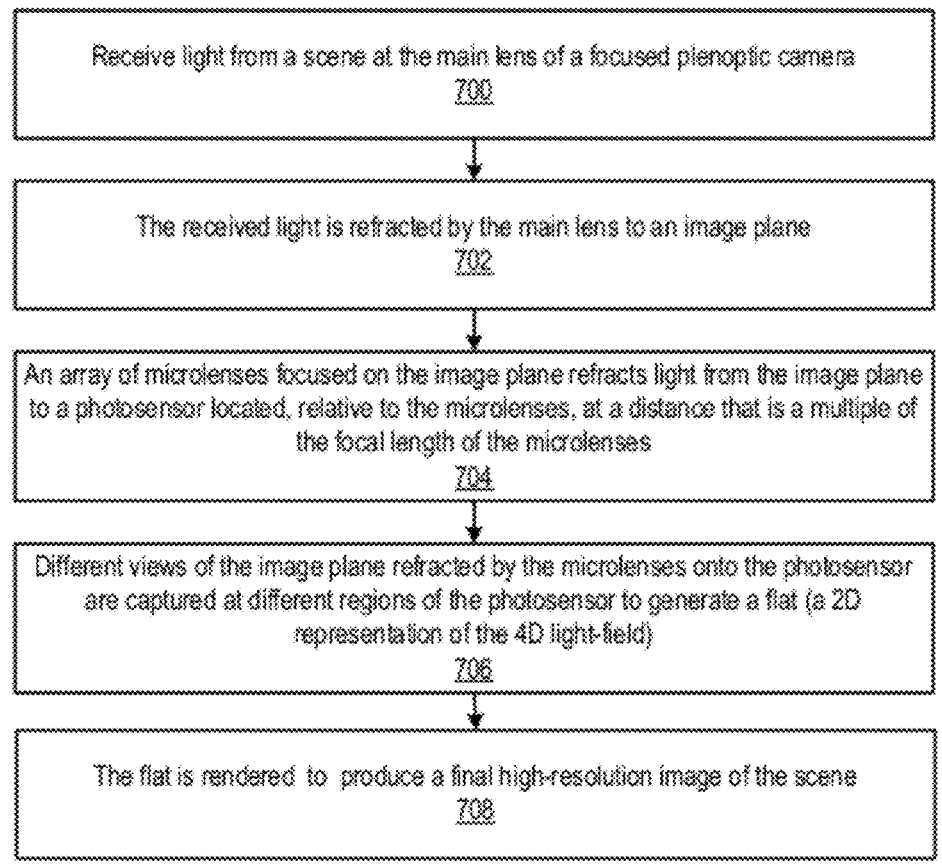
FIG. 21 is a flow chart illustrating how light is directed within a focused plenoptic camera according to one embodiment.

FIG. 21 is a flow chart illustrating how light is directed within a focused plenoptic camera according to one embodiment. As indicated at 700, light from a scene is received at the main lens of a focused plenoptic camera. FIGS. 6, 7 and 8 illustrate example focused plenoptic cameras. As indicated at 702, the received light is refracted by the main lens to an image plane. As indicated at 704, an array of microlenses, the microlenses of which are focused on the image plane, refracts light from the image plane onto a photosensor located, relative to the microlenses, at a distance that is a multiple of the focal length f of the microlenses. For example, the distance between the microlenses and the photosensor may be ¾ f, ⅘ f, ⅗ f, 1.5 f, and so on. As indicated at 706, different views of the image plane, refracted by the microlenses onto the photosensor, are captured at different regions of the photosensor to generate a flat, which is a 2D representation of the 4D light-field. In some embodiments, the photosensor may be a device configured to digitally capture light such as a CCD, while in other embodiments the photosensor may be conventional film. As indicated at 708, the captured flat may be rendered to produce a final high-resolution image, or images, of the scene, for example using a full-resolution light-field rendering method as described in FIG. 22. For flats captured on conventional film, the flat may be digitized to generate a digitized flat before rendering.

Figure 22:
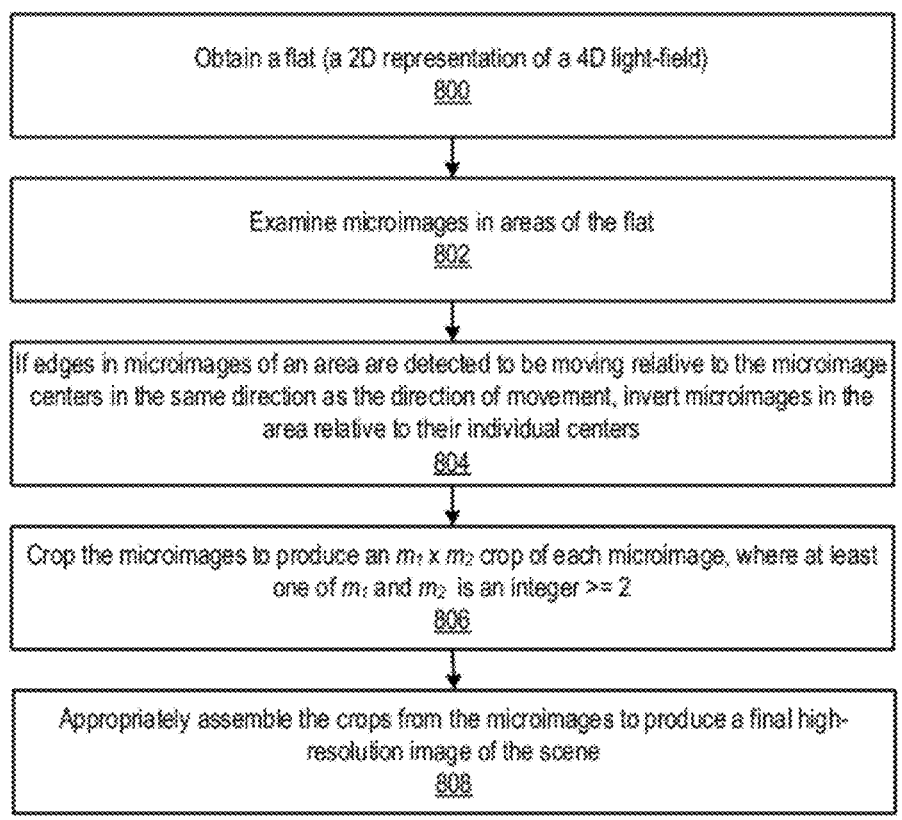
FIG. 22 is a flowchart of a full-resolution light-field rendering method according to one embodiment.

FIG. 22 is a flowchart of a full-resolution light-field rendering method according to one embodiment. As indicated at 800, a flat captured by a focused plenoptic camera may be obtained (see, e.g., FIG. 9 for an example of what such a flat may look like to a human observer). As indicated at 802, microimages in areas of the flat may be examined (manually or automatically, as described below) to determine the direction of movement of edges in the microimages relative to a direction of movement of the algorithm. At 804, if it is determined that edges in microimages of an area are moving relative to the microimage centers in the same direction as the direction of movement, the microimages in that area may be inverted relative to their individual centers. If the edges are not moving relative to the microimage centers in the same direction as the direction of movement (i.e., if the edges are moving in the opposite direction as the direction of movement), then the microimages in the area are not inverted.

In some embodiments, examination of the microimages to determine the direction of movement of edges may be performed manually by a user via a user interface. The user may mark or otherwise indicate areas that the user determines need be inverted via the user interface. In some embodiments, examination of the microimages to determine the direction of movement of edges may be performed automatically in software. In some embodiments, an automated software method may examine the microimages to determine noise in the microimages, for example using a Fourier transform to detect peaks at certain frequencies. An excessive amount of noise in an area of the final rendered image may indicate that microimages in that area are flipped, and thus need to be inverted. Microimages that include noise over a specified threshold may be marked to be inverted.

As indicated at 806, the microimages may each be cropped to produce an $m_1 \times m_2$ subregion or crop of each microimage, where at least one of $m_1$ and $m_2$ is an integer greater than two. As indicated at 808, the subregions or crops from the microimages may be appropriately assembled to produce a final high-resolution image of the scene.

In some embodiments, instead of cropping the microimages and assembling the subregions generated by the cropping, the microimages themselves may be appropriately assembled to produce a final high-resolution image of the scene. Thus, in these embodiments, element 806 is not performed; at 808, the microimages are assembled to produce an output image. In assembling the microimages, overlapping portions of adjacent microimages may be merged, blended, or otherwise handled.

In some embodiments, two or more images rendered from a flat according to rendering methods described herein may be combined to produce a higher-quality output image. For example, in some embodiments, the microimages in a flat may all be inverted, and the inverted microimages appropriately assembled to produce a first intermediate image. A second intermediate image may be generated without inverting the microimages prior to assembling. The two intermediate images may then be combined to produce a higher-quality output image. The combination of the two images may be performed manually by a user via a user interface, for example using a selection tool to select portions of an image to be combined with the other image, or alternatively may be performed automatically in software, for example using a noise detection technique as described above to find excessively noisy regions of one or both intermediate images. As an example, when combining the images, the user may manually (or software may automatically) select areas in one intermediate image that are of higher quality than the same areas in the other image, and then combine the selected areas with the other image to produce an output image that includes the highest quality portions of the two intermediate images. In some embodiments, a map (e.g., a bitmap) may be generated that indicates areas of each image that are to be included in the output image, and then the output image may be generated from the two intermediate images according to the map. In some embodiments, more than two intermediate images may be generated, and a similar method may be used to generate a higher-quality output image from the intermediate images.

Figure 25:
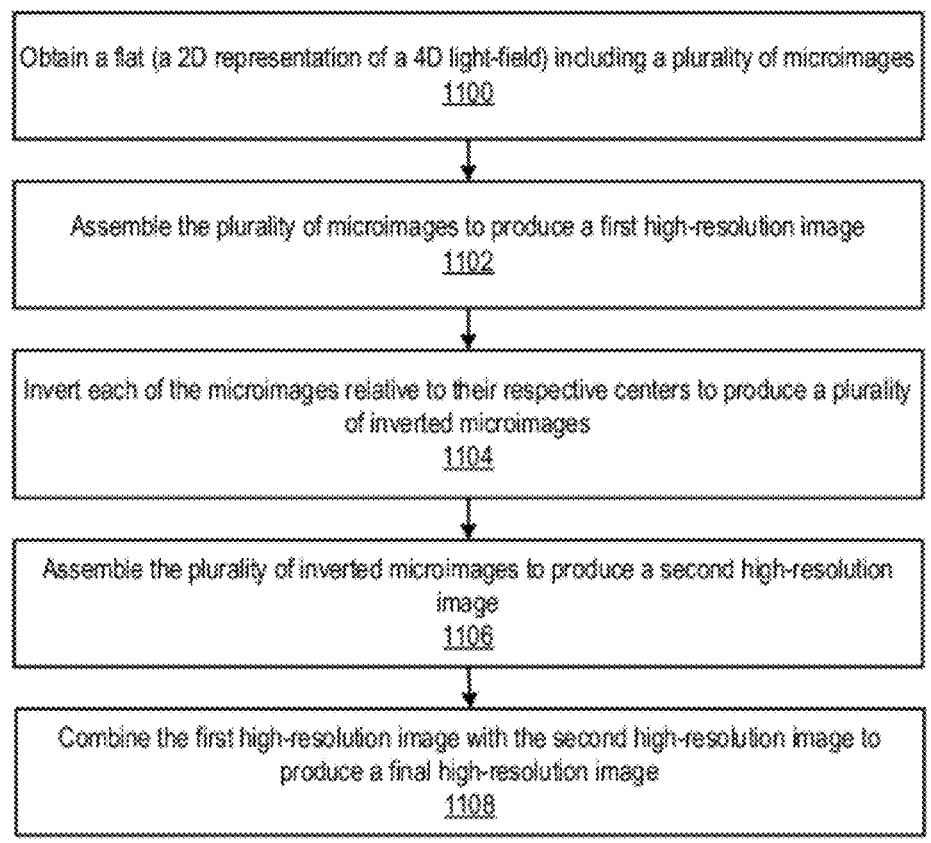
FIG. 25 is a flowchart of a full-resolution light-field rendering method in which multiple images are rendered from a flat and combined to produce a final high-resolution output image, according to some embodiments.

FIG. 25 is a flowchart of a full-resolution light-field rendering method in which multiple images are rendered from a flat and combined to produce a final high-resolution output image, according to some embodiments. As indicated at 1100, a flat captured by a focused plenoptic camera may be obtained (see, e.g., FIG. 9 for an example of what such a flat may look like to a human observer). As indicated at 1102, the plurality of microimages may be assembled to produce a first high-resolution image. As indicated at 1104, each of the microimages may be inverted relative to their respective centers to produce a plurality of inverted microimages. As indicated at 1106, the plurality of inverted microimages may be assembled to produce a second high-resolution image. As indicated at 1108, the first high-resolution image may be combined with the second high-resolution image to produce a final high-resolution image. The combination of the two images may be performed manually by a user via a user interface, for example using a selection tool to select portions of an image to be combined with the other image, or alternatively may be performed automatically in software, for example using a noise detection technique as described above to find excessively noisy regions of one or both intermediate images.

Figure 26:
FIG. 26 shows an example full-resolution rendering of a light-field in which foreground and background portions of the images shown in FIGS. 19 and 20 have been combined, according to one embodiment of the full-resolution light-field rendering method.

FIG. 26 shows an example full-resolution rendering of a light-field in which foreground and background portions of the example images shown in FIGS. 19 and 20 have been combined to produce a higher-quality output image. In FIG. 26, the foreground portion (the tree) of FIG. 19 has been replaced with the corresponding foreground portion of FIG. 19.

In some embodiments, multiple images may be rendered from a flat according to rendering methods described herein, using different values for $m_1$ and/or $m_2$ to crop the microimages before assembling the crops. This may produce multiple images with different visual quality. For example, assuming a square crop is to be made (i.e., $m_1=m_2$), some embodiments may be configured to perform the rendering using values for $m_1$ and $m_2$ in a specified range, for example from 5 to 10 inclusive to produce 6 output images, from 5 to 20 to produce 16 output images, and so on. One or more images may then be selected from among the multiple rendered images according to the quality of the images as output image(s). The selection may be performed manually, for example by a user via a user interface, or alternatively may be performed automatically in software, for example using a noise detection technique as described above to select images with lower levels of noise in one or more frequencies. Alternatively, two or more of the images may be selected and combined to generate a higher-quality output image. The combination of the images may be performed manually or automatically.

In some embodiments, inversion and cropping of microimages may be combined in a single automatic operation. For example, in some embodiments, a software module or modules configured to perform both inversion and cropping of microimages in a flat or in a specified area of a flat may have $(m_1, m_2)$ as input parameters (or, alternatively, an input parameter m if the crop is to be a square and thus $m_1=m_2$). A negative value for $(m_1, m_2)$ may be used to indicate that the microimages in the input flat or area are to be inverted, with a positive value for $(m_1, m_2)$ indicating that the microimages are not to be inverted. Other methods to indicate whether microimages are to be inverted may be used.

In some embodiments, inversion and cropping of microimages may be performed in various combinations on an input flat to render multiple rendered images according to the combinations. For example, in one embodiment, some images may be rendered using a range of values for $m_1$ and $m_2$ as described above while also inverting the microimages, while other images may be rendered using a range of values for $m_1$ and $m_2$ as described above in which the microimages are not inverted. One or more of the rendered images may then be manually or automatically selected as output image(s). Alternatively, two or more of the rendered images may be combined as previously described (see, e.g., FIG. 26) to produce an output image.

Super-Resolution in a Focused Plenoptic Camera

Various embodiments of methods and apparatus for super-resolution in focused plenoptic cameras are described. Light fields carry a significant amount of information. This information can be used to generate novel effects when rendering. In embodiments of the focused plenoptic camera (see, e.g., FIGS. 6 through 8), deliberate spatio-angular trade-offs may be made to obtain significant improvements in spatial resolution when compared to conventional plenoptic cameras (see, e.g. FIGS. 3 and 4). The focused plenoptic camera works as an array of cameras (technically, an array of microcameras). These microcameras are focused on the photographed object, a unique feature that distinguishes the focused plenoptic camera from conventional plenoptic cameras. Based on this feature, super-resolution techniques are described that can be applied to the focused plenoptic camera and to the rendering of light-fields captured by the focused plenoptic camera.

With the application of super-resolution techniques to embodiments of the focused plenoptic camera, the attainable spatial resolution of the focused plenoptic camera may be further increased. A factor that has limited the adoption of conventional plenoptic cameras has been the relatively low available resolution. The combination of the focused plenoptic camera with super-resolution techniques as described herein enables images of sizes acceptable to modern photographers, making light-field photography immediately practical.

Embodiments of the focused plenoptic camera capture an array of real images focused on the object. This makes it possible to apply super-resolution techniques to the light-field data captured by a focused plenoptic camera, enabling the focused plenoptic camera to achieve higher spatial resolution. In this section, optical configurations via which a focused plenoptic camera can capture light-field data in images, or flats, suitable for super-resolution techniques are described. An algorithm for super-resolving flats captured with focused plenoptic cameras implementing the optical configurations is described. Experimental results are presented that show an increase in spatial resolution in rendered images when compared to basic focused plenoptic camera rendering approaches, for example as described in FIGS. 22 and 25.

In the methods for rendering flats captured with the focused plenoptic camera, for example as described in FIGS. 22 and 25, the trade-off between spatial and angular resolution is determined by parameters in the camera optics. Depending on depth, some portions of the scene may have more angular samples (and correspondingly, a lower spatial resolution) than others. As will be shown, these additional samples of the same spatial area of the scene can be used to further increase the spatial resolution of that area through the application of super-resolution techniques as described herein.

In the following discussion, the conventional plenoptic camera and the focused plenoptic camera are compared, particularly in terms of trade-offs in spatial and angular resolution. It will be shown that the focused plenoptic camera is equivalent to an array of cameras, each one focused on the object being imaged. Expressions for the positions and parameters at which super-resolution is possible with the focused plenoptic camera will be derived. Several classes of super-resolution algorithms for the focused plenoptic camera will be developed and analyzed. A method for super-resolving objects at optical infinity with a focused plenoptic camera is described and demonstrated, and experimental results of super-resolution using an example focused plenoptic camera will be presented and compared to results of conventional plenoptic cameras and focused plenoptic cameras without super-resolution.

Conventional Plenoptic Cameras

Figure 27:
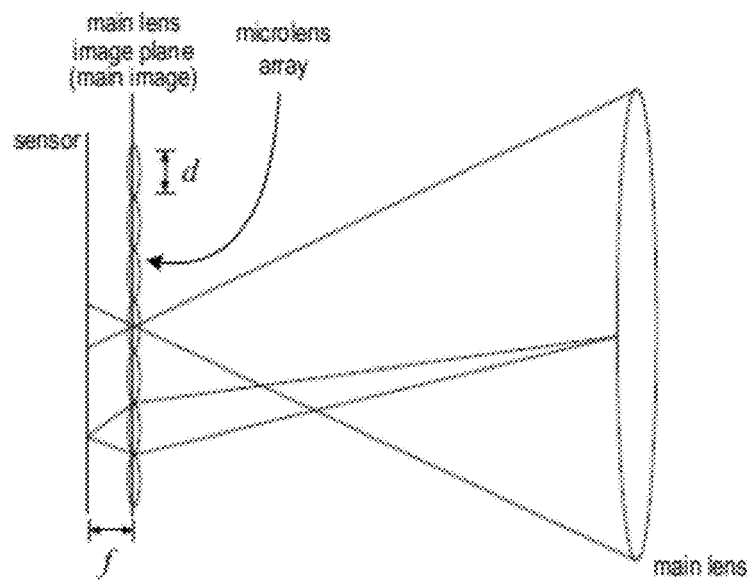
FIG. 27 illustrates a conventional plenoptic camera.

FIG. 27 illustrates a conventional plenoptic camera. Note that the component shown in this Figure are not necessarily to scale relative to each other. A conventional plenoptic camera includes a main lens and a microlens array placed at distance f in front of a sensor. The microlenses have aperture d and focal length f, and are assumed to be equally spaced at interval d. The main lens is focused at the microlens plane, and the microlenses are focused at optical infinity (equivalently, at the main lens).

Considering that the focal length of the main camera lens is much greater than the focal length of the microlenses, each "microcamera" is focused at the main camera lens aperture, and not on the object being photographed. Each microlens image is thus completely defocused relative to that object, and represents only the angular distribution of the radiance. As a rule, these microimages look blurry and do not represent a human-recognizable image. Since each microlens image samples a given location depending on its position and spans the same angular range, rendering an output image from a conventional plenoptic camera radiance image can be accomplished by integrating all of the pixels under each microlens. Integrating a fixed portion of the pixels under each microlens generates an image of one certain view. In all cases, each microlens contributes to a single pixel in the final image.

The Focused Plenoptic Camera

Figure 28:
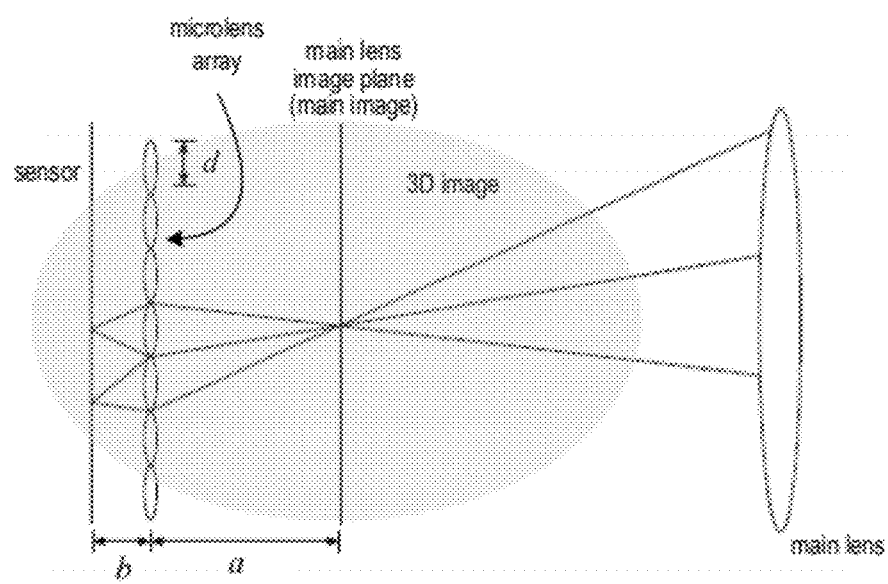
FIG. 28 illustrates an example focused plenoptic camera, according to some embodiments.

FIG. 28 illustrates an example focused plenoptic camera, according to some embodiments. Note that the components shown in this Figure are not necessarily to scale relative to each other, nor are the distances between the components necessarily to scale, nor are the sizes of the components necessarily to scale. The focused plenoptic camera may include at least a main lens, a microlens array, and a sensor. However, in the focused plenoptic camera, the array of "microcameras" is focused on an image plane of the main camera lens instead of at infinity, as in the conventional plenoptic camera shown in FIG. 27. With the focused plenoptic camera, each microcamera is reimaging the main lens image onto the sensor. The microlenses form an array of true images of the main lens image as a relay system.

The ovoid shaded area in FIG. 28 represents the 3D image formed inside the camera by the main camera lens. Note that this 3D image may extend behind the microlenses. FIG. 28 illustrates the Keplerian telescopic case (see FIG. 10) where the image plane being imaged is in front of the microlenses. If the main lens forms an image behind the microlenses, it is still possible to focus the microlenses on that virtual image so that they form a real image on the sensor. This is the Galilean telescopic case (see, e.g., FIG. 12). In both the Keplerian telescopic case and the Galilean telescopic case, the microlens imaging is described by the lens equation:

$$\frac{1}{a} + \frac{1}{b} = \frac{1}{f}$$

with, respectively, positive a (Keplerian telescopic case) or negative a (Galilean telescopic case). When remapped onto the sensor, the image of the main lens is reduced in size. This reduction may be denoted as:

$$m = \frac{a}{b}$$

As a result of this scaling, the spatial resolution of the radiance captured by the plenoptic camera is a function of the resolution of the microlens images and the amount of overlap in rendering, and not of the number of microlenses. This decoupling of resolution and number of microlenses is a critical observation that distinguishes the focused plenoptic camera from the conventional plenoptic camera.

Another difference between the conventional plenoptic camera and the focused plenoptic camera is in the nature of the information that is captured by each microlens. In the conventional plenoptic camera, each microlens images one position in the scene, capturing all of the angular information there. In the focused plenoptic camera, different microlenses capture the same position; angular information is spread across microlenses. Accordingly, to render flats captured with the focused plenoptic camera, the rendering algorithm integrates across microlens images, rather than within a single microlens image. That is, assuming that the task is "imaging the image" that is in focus, the rendering algorithm integrates the points in the microlenses that correspond to the same position in the image by overlapping them at a fixed pitch. See FIGS. 22 and 25 for examples of rendering algorithms for flats captured with embodiments of the focused plenoptic camera.

In order to apply super-resolution techniques to the focused plenoptic camera, the microcamera array needs to be precisely characterized. In particular, the array of microlenses together with the main lens is equivalent to an array of cameras due to the focused plenoptic camera's relay imaging mode of work (see FIG. 28). An array of microcameras observe the "object" in front of them. This "object" is the aerial 3D image of the scene, formed behind the main camera lens, represented as a shaded ovoid in FIG. 28. Since super-resolution is applicable to an array of cameras imaging an object, it is applicable to focused plenoptic camera imaging.

Focused Plenoptic Cameras with Super-Resolution

Super-Resolution Model

The super-resolution problem is to recover a high-resolution source from multiple low-resolution observations. The low-resolution observations may be produced in a variety of different ways, depending on the application. They may be captured by a camera array, a single shifted camera, or they may even be different frames of a video sequence.

Figure 29:
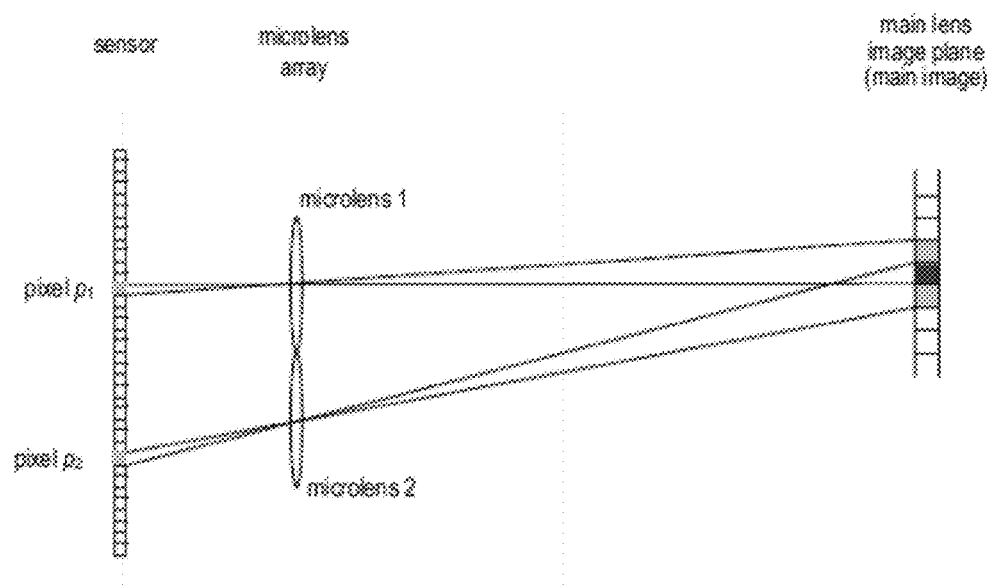
FIG. 29 illustrates low-resolution acquisition of a high-resolution image in a focused plenoptic camera according to some embodiments.
Figure 30:
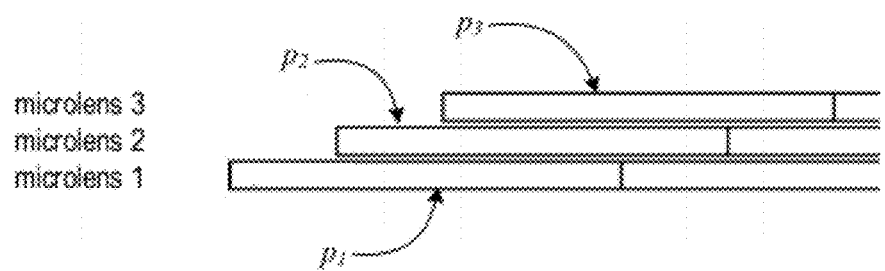
FIG. 30 graphically illustrates three overlapping pixels in a sampling area.

FIG. 29 illustrates low-resolution acquisition of a high-resolution image in a focused plenoptic camera according to some embodiments. The microlenses sample overlapping regions of the high-resolution image generated by the main camera lens. The image-acquisition process in the focused plenoptic camera as shown in FIG. 29 is modeled as follows. A pixel $p_1$ under microlens 1 samples radiance within a certain angle from a given spatial area in the main lens image (in front of the microlenses). In the same way, a pixel $p_2$ under microlens 2 samples an area partially overlapping with the area sampled by $p_1$, i.e., an area shifted by a subpixel amount. In FIG. 29, the overlapping area for pixels $p_1$ and $p_2$ is the darker shaded area of the main image. A pixel $p_3$ under microlens 3 (not shown in FIG. 29) samples an area partially overlapping with the area sampled by $p_1$ and $p_2$, and so on. FIG. 30 graphically illustrates three overlapping pixels ($p_1$, $p_2$, $p_3$) in a sampling area. In FIG. 30, for illustrative purposes, the pixels are mapped from the sensor to the area sampled and placed on top of each other in space.

Each of the pixels samples a version of the outside world scene, blurred through the kernel of the focused plenoptic camera optics. This includes both the main lens and microlens corresponding to the pixel. In addition, the final pixel value is the result of the convolution of that blurred image with the point-spread function of the pixel sensor's responsivity. The total kernel may be represented as H with an added noise term. This is an analysis of super-resolution, adapted to the focused plenoptic camera:

$$L = Hx + n \qquad (1)$$

where L represents the collected low-resolution observed images, H is the blur matrix, n is a noise term, and x is the high-resolution image that is to be recovered. Recovering x is then cast as a minimization problem:

$$\min_x \{\|Hx - L\|_2^2 + \alpha R(x)\} \qquad (2)$$

where R(f) is a regularization term, the choice of which depends on the application and desired solution characteristics. The minimization problem may then be solved using any one of several techniques.

In super-resolution, there needs to be nonintegral (sub-pixel) shifts between different aliased observations of the high-resolution images. In the general case, estimating these shifts (and, consequently, forming H) is also part of the super-resolution problem. In the case of the focused plenoptic camera, some of the super-resolution problem is simplified, as the focused plenoptic camera is essentially an array of cameras spaced with predetermined micron precision. On the other hand, the shift between features from one microlens image to the next depends on the scene and the camera optics.

Focused Plenoptic Camera Design for Super-Resolution

Figure 31:
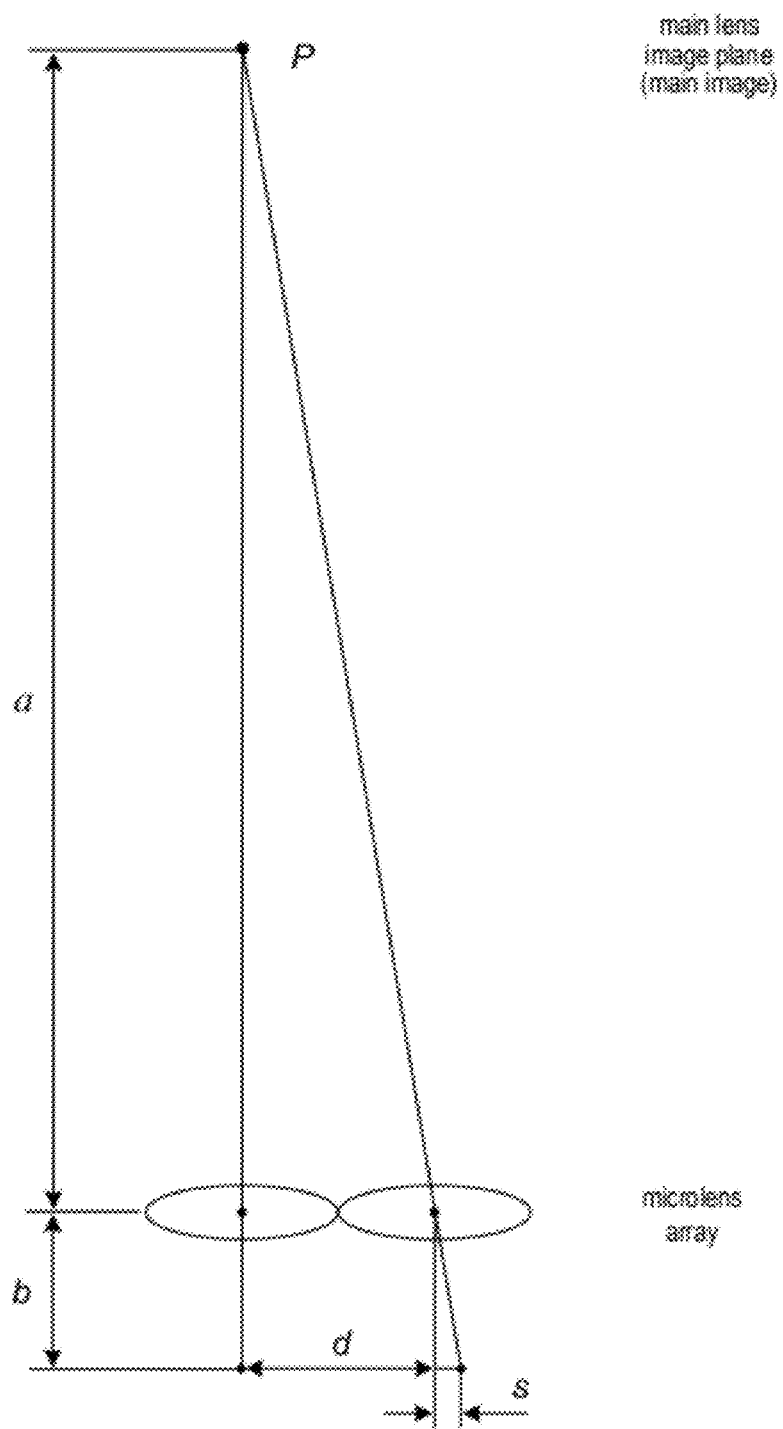
FIG. 31 illustrates the geometry of data capture for super-resolution with the focused plenoptic camera, according to some embodiments.

In this section, methods for designing the optics of the focused plenoptic camera to best support super-resolution are described. FIG. 31 illustrates the geometry of data capture for super-resolution with the focused plenoptic camera, according to some embodiments. As previously discussed, the focused plenoptic camera can be viewed as a relay imaging system, an array of microcameras focused on the image created by the main camera lens. Referring to FIG. 31, consider one luminous point P in the main lens image. FIG. 31 represents the imaging of this point in two microcameras. To be amenable to super-resolution, the distance between the images of the point should be a nonintegral pixel value.

In FIG. 31, it can be seen that $d/a = s/b$. From this observation, $a = db/s$ is derived. Since, in general, the distance d between microlens centers is already not an integer, it would not be appropriate to constrain s as a way of controlling the subpixel shift. Rather, let the next integer larger than d be $\Delta = d + x$ and let $s = x + t$. Since the pixel size and d are known with precision, x is known. Therefore, t is the translation from the integer pixel location to the image of the observed point. In this way, $t = s - x$ is the quantity that is required to have a nonintegral value.

Note that there are multiple regions in the scene (multiple values of a and b) for which t will have a nonintegral value. For instance, for 2×2 super-resolution, t can be taken to be 0.5 pixels, but t can also be taken to be 1.5, or 2.5, or, in general, $0.5 + n$ for $n = 0, 1, 2, 3, \ldots$. After super-resolving, these values for t provide the same 2× increase in the resolution.

The general case is $t = k + n$, where k is a fraction less than 1. Different types of super-resolution can be designed with different k. With this notation, the general equation can be written as:

$$a = \frac{db}{x + k + n} \qquad (3)$$

From the above, super-resolution is achieved with microimages shifted by $\Delta + k + n$ pixels.

In the focused plenoptic camera, the portion of the scene that is at optical infinity (i.e., imaged at the largest distance from the microlenses) will have the greatest reduction in size; that is, the lowest spatial resolution under focused plenoptic camera rendering. In addition, since the portion of the scene that is at optical infinity is the farthest from the microlenses, it has the most angular samples. The low resolution and the availability of the most angular samples also means that this region of the scene is generally the most important to use for support of super-resolution.

Different depths in the scene are imaged at different distances a in front of the microlenses. This creates a difficulty for support of super-resolution because the depths would super-resolve at different values of k. Solving this problem requires subpixel registration among all microimages, which may be a difficult problem, as the solution may be computationally expensive or unreliable for automatic super-resolution. In addition, certain depths would not be super-resolvable at all if the shift between microimages happens to be close to or equal to an integral number of pixels. This type of problem has plagued conventional super-resolution methods, and the conventional super-resolution methods still remain too unreliable for commercial image-processing products.

However, the focused plenoptic camera has the unique characteristic that there is one special depth in the scene, the depth of infinity, which is always mapped to the same location in front of the microlenses, one focal length from the main camera lens. Infinity is also the depth that benefits most from focused plenoptic camera super-resolution. This is also the depth that can be handled with highest precision for super-resolution since it is fixed and subpixel correspondence is set and exactly known in advance.

Figure 32:
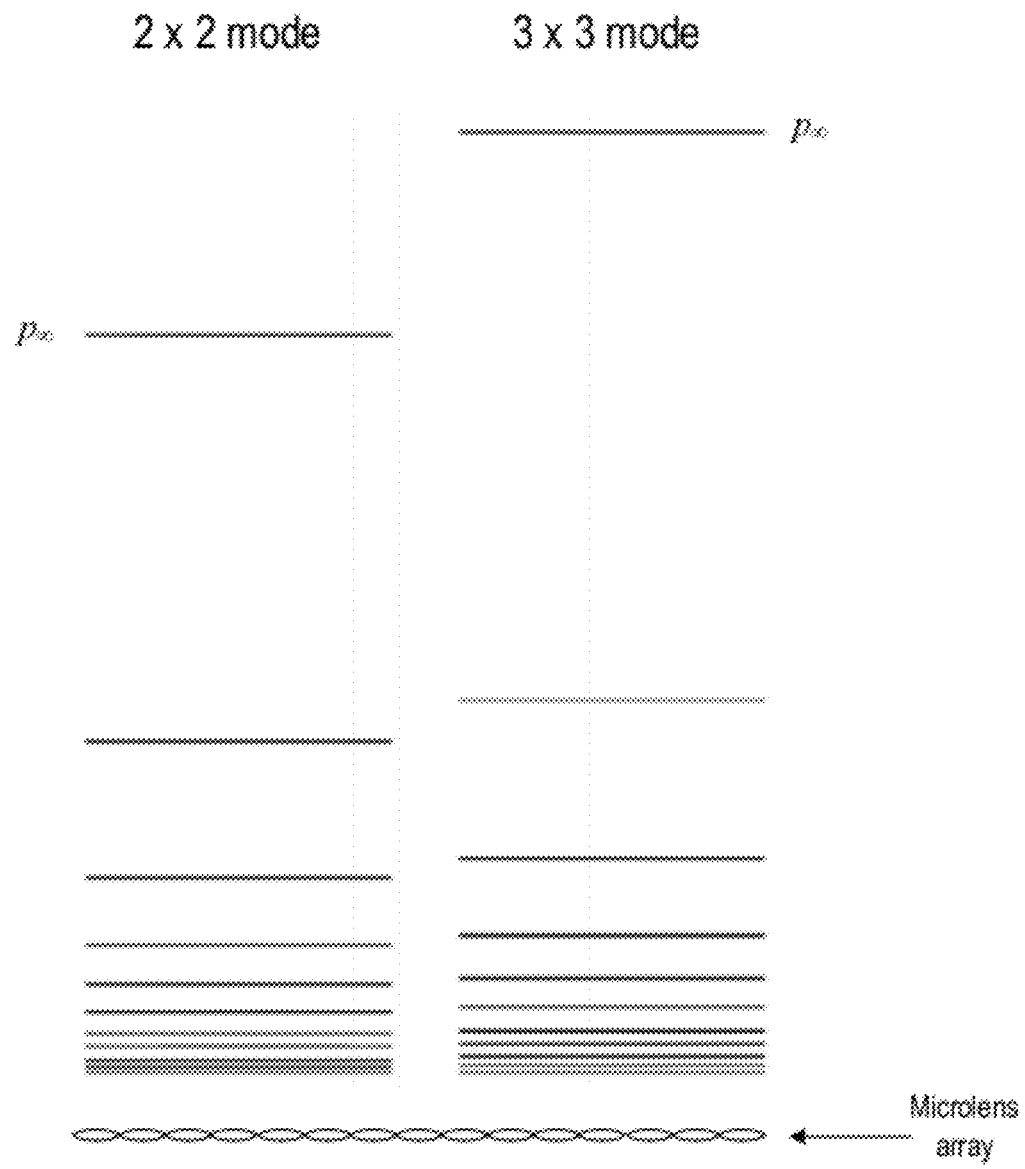
FIG. 32 graphically illustrates planes at different distances from the microlenses at which the focused plenoptic camera super-resolves in 2×2 and 3×3 modes, according to some embodiments.

For a given type of super-resolution (defined by the fraction k) there are a number of planes that satisfy the subpixel shift condition. As these planes approach the microlens array, the planes become closer together, denser and denser; at a certain point their position becomes hard to determine and unreliable (see FIG. 32). FIG. 32 graphically illustrates planes at different distances from the microlenses (represented in the vertical direction) at which the focused plenoptic camera super-resolves in 2×2 and 3×3 modes, according to some embodiments. The plane corresponding to infinity $p_\infty$ is the farthest plane from the microlens array at which there is an image to capture. The separation between this plane and the previous plane is the largest. This makes this the plane with most reliable correspondence, and best for super-resolution.

A focused plenoptic camera may thus be designed and implemented such that infinity is super resolved directly, with registration provided by the camera geometry and the microlens pitch. This avoids estimation of registration from the imagery. At the same time, the registration is much more precise and reliable.

However, while the plane corresponding to infinity $p_\infty$ for a particular super-resolution mode may be best for super-resolution at that mode, the other planes for that mode also work well for super-resolution at that mode. Also note that super-resolution may be used at locations at or near the planes; super-resolution for a given mode will work best when exactly at one of the planes, however, super-resolution will also work satisfactorily for the mode when not exactly at but nearby any of the planes corresponding to that mode.

Another thing to note about FIG. 32 is that the 2×2 and 3×3 super-resolution modes, and other super-resolution modes (e.g., 5×5), may all be realized in the same focused plenoptic camera. Thus, referring to FIG. 32, the 2×2 and 3×3 planes may be overlaid so that the planes are "interleaved", as could planes for one or more other super-resolution modes; there are thus many planes in the focused plenoptic camera at which some level of super resolution (2×2, 3×3, etc.) may be realized. Thus, for a given flat captured with the focused plenoptic camera at some optical setting, there is generally at least one plane at which at least one of the levels of super-resolution may be applied.

Focused Plenoptic Camera with Super-Resolution Design Examples

FIGS. 6 through 8 illustrate example film camera and digital camera embodiments of a focused plenoptic camera that may be configured as described herein to support super-resolution. The parameters of an example physical focused plenoptic camera implementation to support super-resolution are as follows. The microlens pitch of the example focused plenoptic camera is 500 μm and the sensor pixels are 6.8 μm. Thus, d=73.5294 pixels, Δ=74 pixels, and x=0.4706 pixels. The value for b≈1.6 mm may not be estimated with precision better than 0.1 mm because of the cover glass of the sensor. However, the value for b may be approximately estimated from known sensor parameters and independently from the microlens images at different F/numbers. Thus, db≈120 mm is computed. Note that a and b are measured in millimeters, while everything else is measured in pixels (i.e. no units). Also note that these parameters for a focused plenoptic camera that supports super-resolution are given by way of example; other designs for focused plenoptic cameras are possible and contemplated that utilize other values for microlens pitches, sensor pixel sizes, and so on, and that support super-resolution as described herein.

2×2 Super-Resolution

The following describes super-resolving a focused plenoptic camera image by increasing the size by 2 in each direction (2×2 super-resolution). For 2×2 super-resolution, t=0.5+n, where n=0, 1, 2, 3, . . . and a=db/(x+0.5+n). With the parameters of the example focused plenoptic camera described above, a≈120/(1+n), measured in millimeters. The values of n at which the camera super-resolves and the corresponding distances a (in millimeters) are given in the Table 1. Note that other designs for focused plenoptic cameras may yield different values in Table 1 for 2×2 resolution with the particular design.

TABLE 1

| a | 120 | 60 | 40 | 30 | 24 | 20 | 17.1 | 15 | 13.3 | 12 | 10.9 | 10 | 9.2 |
|---|---|---|---|---|---|---|---|---|---|---|---|---|---|
| n | 0 | 1 | 2 | 3 | 4 | 5 | 6 | 7 | 8 | 9 | 10 | 11 | 12 |

3×3 Super-Resolution

The following describes super-resolving a focused plenoptic camera image by increasing the size by 3 in each direction (3×3 super-resolution). To super resolve a focused plenoptic camera image three times in each direction, t=⅓+n, where n=0, 1, 2, 3, . . . and a=db/(x+⅓+n). With the parameters of the example focused plenoptic camera described above, a≈120/(0.8+n), measured in millimeters. The values of n at which the camera super resolves and the corresponding distances a (in millimeters) are given in Table 2. Note that other designs for focused plenoptic cameras may yield different values in Table 2 for 3×3 resolution with the particular design.

TABLE 2

| a | 150 | 66.6 | 42.8 | 31.6 | 25 | 20.7 | 17.6 | 15.4 | 13.6 | 12.2 | 11.1 |
|---|---|---|---|---|---|---|---|---|---|---|---|
| n | 0 | 1 | 2 | 3 | 4 | 5 | 6 | 7 | 8 | 9 | 10 |

The depth planes at which the above two types of super-resolution work are graphically represented in FIG. 32. FIG. 32 graphically illustrates planes at different distances from the microlenses (represented in the vertical direction) at which the focused plenoptic camera super resolves in 2×2 and 3×3 mode. The plane corresponding to infinity $p_\infty$ is the farthest plane from the microlens array at which there is an image to capture.

Other modes of super-resolution, such as 5×5, and so on, may be similarly designed and implemented in the focused plenoptic camera, and similar Tables may be generated for the other modes.

The above description focuses on determining the appropriate super-resolution mode to be used from the internal geometry of the focused plenoptic camera. Using these methods and formulas, generally, some plane can be identified from the geometry of the camera at which one of the super-resolution modes can be applied. The pixel size, microlens pitch, distance from the microlenses to the sensor, and other aspects of the internal camera geometry are known with precision; these geometry parameters may thus be used to identify an appropriate super-resolution mode to apply to a given image captured at some setting of the camera. In some embodiments, if a focal plane suitable for super-resolution at some super-resolution level cannot be identified from the camera geometry, the focused plenoptic camera rendering method may fall back on a super-resolution method that analyzes the microimages in the flat to determine subpixel shift, and super-resolution may then be applied according to the analytically determined subpixel shift, rather than according to the method that relies on the known geometry of the camera. Note, however, that in super-resolution, there needs to be nonintegral (subpixel) shifts between different aliased observations of the high-resolution images; at integral values for the subpixel shift, super-resolution is not applicable.

Super-Resolution Algorithms for the Focused Plenoptic Camera

Figure 33:
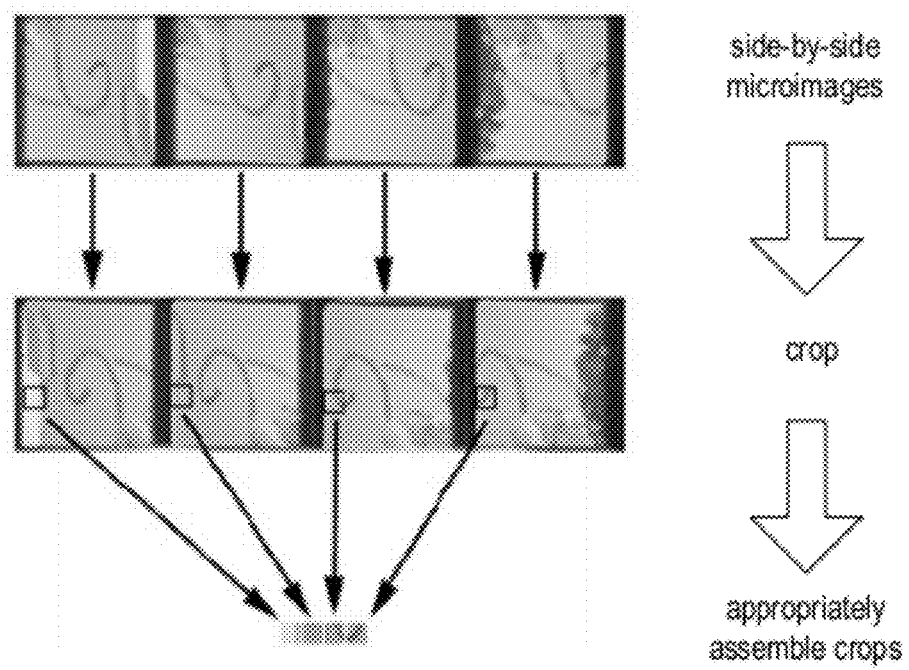
FIG. 33 graphically illustrates a rendering method for flats captured with the focused plenoptic camera without super-resolution.

FIG. 33 graphically illustrates a rendering method for flats captured with the focused plenoptic camera without super-resolution. (See, e.g., FIG. 22). The rectangles in the images of the second row illustrate crops from the four side-by-side microimages. The bottom row shows the four crops as appropriately assembled in the output image.

However, this rendering method tends to waste pixels. Applying super-resolution to the rendering process allows more pixels from each microimage to be used. The method may broadly be stated as making the crop squares larger so that, on each image, the portion covered by the crop square is overlapping some portion of the crop square from the next image. Note that the two crop squares are imaging the same pixels in some overlapping range. Also note that two, three or more microimages may overlap (see, e.g., FIG. 30). Where the microimages overlap, the overlapping portion may be used to increase the resolution via the super-resolution method as described herein, thereby increasing the resolution of the resulting output image.

The following broadly describes a super-resolution algorithm that may be used, for example, to render super-resolved images from flats captured with a focused plenoptic camera appropriately configured for super-resolution as described herein. To solve equation (1) in the example 3×3 case, the following general approach may be used in some embodiments. This algorithm may be adapted for use at other levels of super-resolution (2×2, 5×5, etc.).

- Create a high-resolution observed image by interleaving pixels from adjacent microlens images. In the examples given herein, a 3×3 resolution increase is generally used, so each microlens image interleaves pixels from its eight nearest neighbors.
- Solve equation (1) (L=Hx+n) with an appropriate computational method. In some embodiments, a deconvolution method with Gaussian and sparse priors may be used. The kernel used for deconvolution may be obtained, for example, by imaging a point light source (pinhole). Other embodiments may use other computational methods to solve equation (1).

Figure 34:
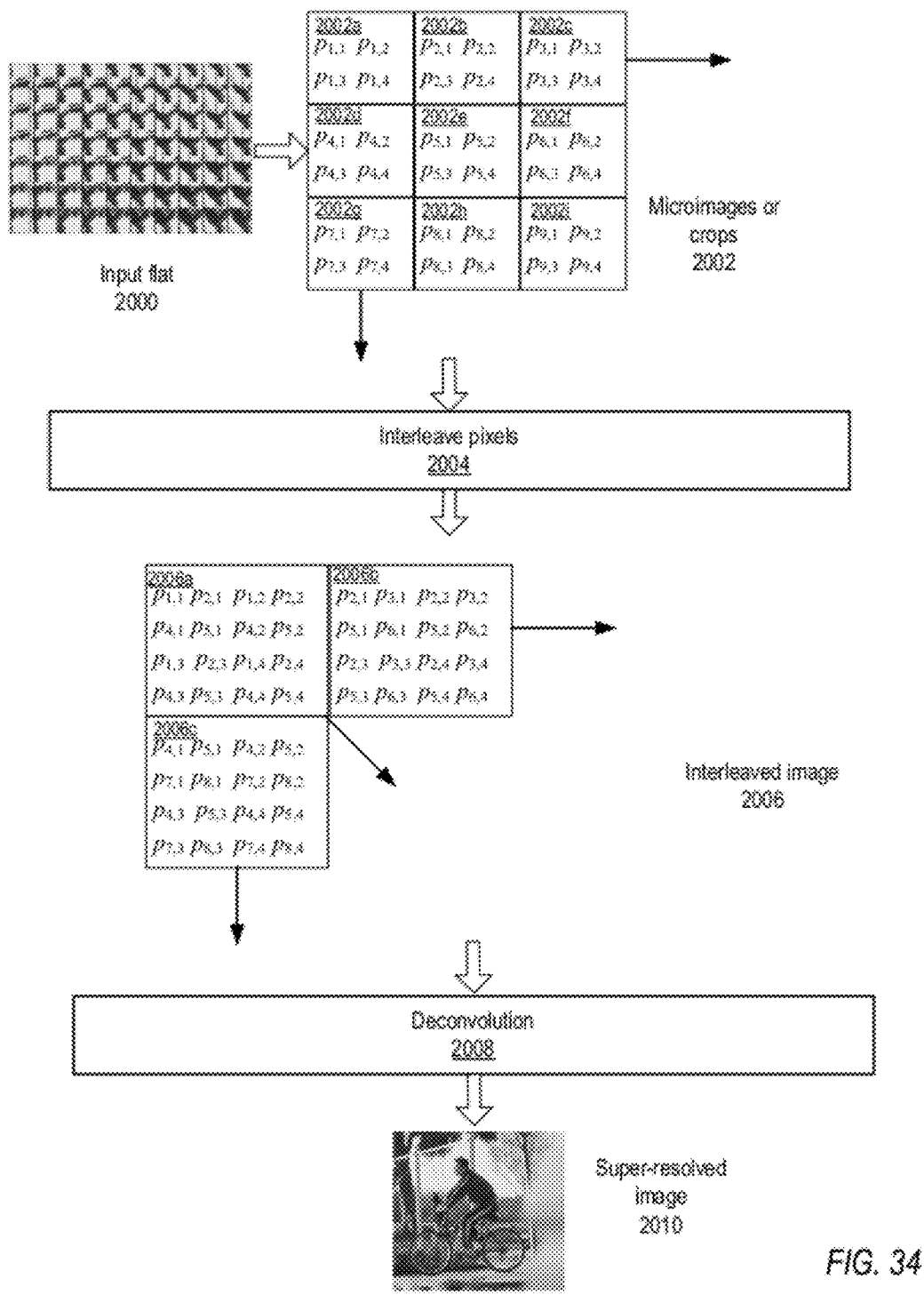
FIG. 34 graphically illustrates a super-resolution rendering algorithm, according to some embodiments.

FIG. 34 graphically illustrates a super-resolution rendering algorithm, according to some embodiments, as applied to a simple example of 2×2 super-resolution, where each "crop" or microimage includes four pixels. Input flat 2000 represents a portion of a flat captured with an implementation of the focused plenoptic camera. Microimages or crops 2002 represent pixels in a subset of the microimages, or in crops selected from the microimages, alphanumerically. For example, a first microimage/crop 2002 includes pixels ($p_{1,1}$, $p_{1,2}$, $p_{1,3}$, $p_{1,4}$). At 2004, the pixels from the microimages are interleaved; since 2×2 super-resolution is being performed, the pixels from four adjacent microimages are interleaved. The output of interleaving 2004 is a raw interleaved image 2006. The interleaved image 2006 is constructed from multiple subimages, each including multiple (four, for 2×2 super-resolution) interleaved microimages or crops 2002 appropriately assembled. For example, subimage 2006a includes interleaved pixels from 2002a, 2002b, 2002d, and 2002e, subimage 2006b includes interleaved pixels from 2002b, 2002c, 2002e, and 2002f, and subimage 2006c includes interleaved pixels from 2002d, 2002e, 2002g, and 2002h.

After interleaved image 2006 is constructed, a deconvolution technique, or some other technique, may be applied to the image to generate the output super-resolved image 2010. Since each pixel of the interleaved image 2006 is sampled from a large area of the main image in the camera and not from a point, interleaving the pixels tends to blur the image, which is sharp in the main image at the image plane captured by the microlenses. Deconvolution, or some other technique, may be applied to remove the blur.

Figure 35:
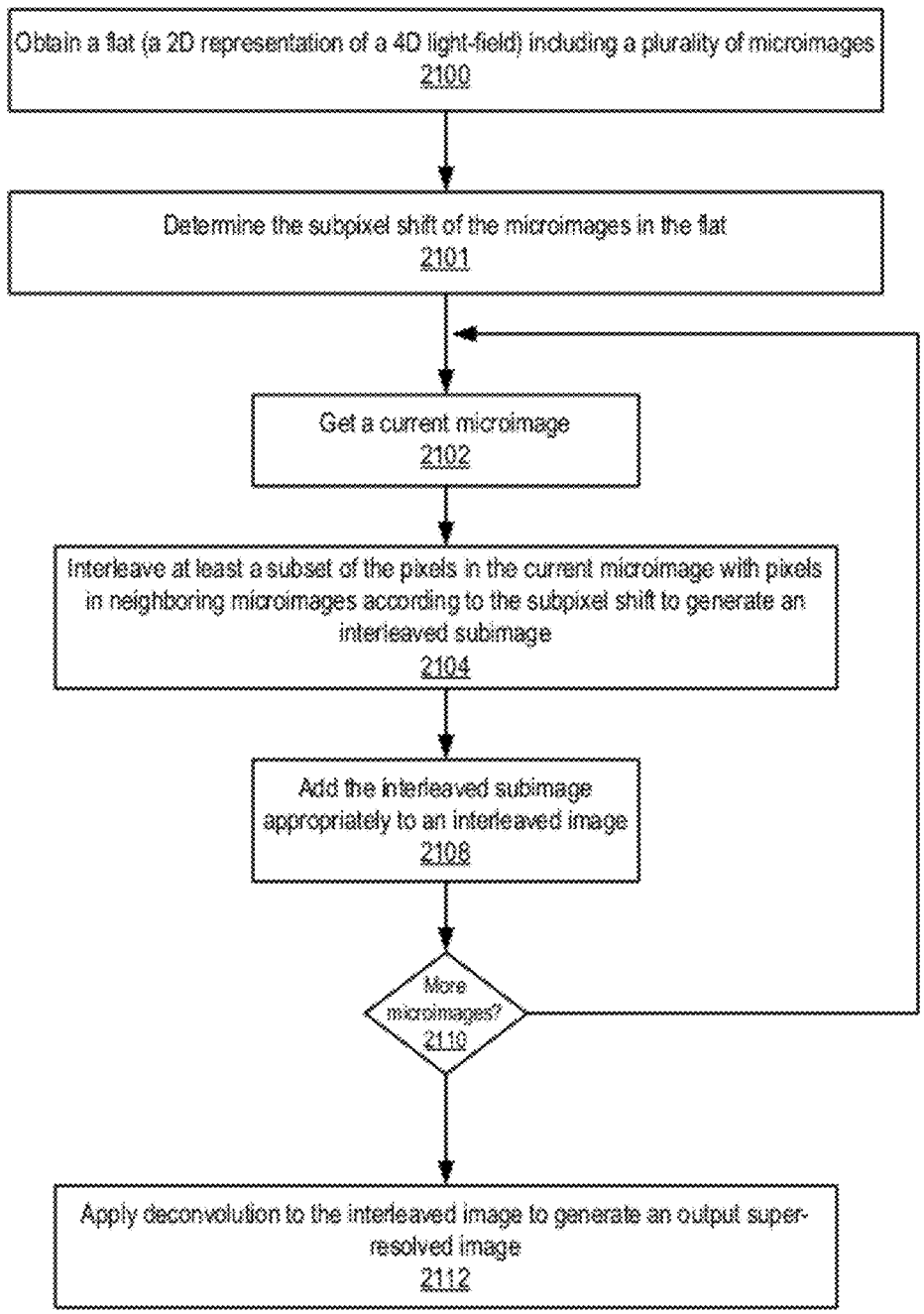
FIG. 35 is a flowchart of a general method for applying super-resolution to flats captured with a focused plenoptic camera, according to some embodiments.

FIG. 35 is a flowchart of a general method for applying super-resolution to flats captured with a focused plenoptic camera, according to some embodiments. As indicated at 2100, a flat (a 2D representation of a 4D light-field) including a plurality of microimages may be obtained. The flat may have been captured by a focused plenoptic camera appropriately configured to support super-resolution, and may have been captured according to an appropriate optical setting to support super-resolution (see, for example, Tables 1 and 2).

As indicated at 2101, the method may determine a subpixel shift that indicates the amount of overlap of the pixels in the microimages. In some embodiments, determining the subpixel shift may be performed by determining the subpixel shift according to configuration values of the focused plenoptic camera used to capture the flat. The configuration values may include pitch of the microlenses in a microlens array of the focused plenoptic camera, distance from the microlenses to a photosensor of the focused plenoptic camera, and distance from the microlenses to an image plane of an objective lens of the focused plenoptic camera at which the flat was captured. In some embodiments, the subpixel shift may alternatively be determined according to an analysis of at least two of the microimages that include overlapping portions of the image of the scene.

The method may iterate over the microimages in the flat to generate an interleaved image. As indicated at 2102, a current microimage may be obtained. As indicated at 2104, at least a subset of the pixels in the current microimage may be interleaved with pixels in neighboring microimages according to the subpixel shift to generate an interleaved subimage. For example, in 2×2 super-resolution, at least a subset of the pixels of the current microimage may be interleaved with pixels from three neighbor microimages; in 3×3 super-resolution, at least a subset of the pixels of the current microimage may be interleaved with pixels from eight neighbor microimages. The subpixel shift may be used to determine the level of super-resolution to be used. For example, a subpixel shift of ½ results in 2×2 super-resolution, a subpixel shift of ⅓ results in 3×3 super-resolution, and so one. Note that the subpixel shift may be approximate, and does not need to be exact, for a level of super-resolution to be used.

As indicated at 2108, the interleaved subimage may be appropriately assembled to generate an interleaved image. Note that in some embodiments the interleaved subimage may be formed directly in interleaved image memory. At 2110, if there are more microimages to be processed, the method returns to 2102 to get a next microimage. Otherwise, the interleaving of the microimages is done, and the output of the process is the interleaved image.

The following is a summary of elements 2102 through 2110 that generalizes the process. Let $L_S$ represent a level of super-resolution determined according to the subpixel shift, where $L_S=(2, 3, 4, \ldots)$. For each microimage, the pixels of the microimage are interleaved with the pixels of $(L_S^2-1)$ neighboring microimages that overlap the current microimage to generate an interleaved subimage, where LS is a level of super-resolution determined according to the subpixel shift. The interleaved subimages are appropriately assembled to generate a high-resolution (interleaved) image of the scene.

As indicated at 2112, after the interleaved image is generated, deconvolution or some other technique may be applied to the interleaved image to generate an output super-resolved image. Since each pixel of the interleaved image is sampled from a large area of the main image in the camera and not from a point, interleaving the pixels tends to blur the image, which is sharp in the main image at the image plane captured by the microlenses. Deconvolution, or some other technique, may be applied at 2112 to remove the blur.

In some embodiments, deconvolution may be applied to each subimage individually, rather than applying deconvolution to the interleaved image.

Example Results

The example images presented in FIGS. 36 through 45 were generated using an example focused plenoptic camera implementation and selecting n=8 in Table 2 for 3×3 super-resolution, corresponding to a distance a=13.6 mm in front of the microlenses for this example camera. A relatively large value of n was used because, for lower values of n, the image may be too far from the microlenses and may be too small.

In the example focused plenoptic camera implementation used to capture these example images, the main camera lens is moved forward with a 13 mm extension tube and, the position of the main lens is fine-tuned by changing the focus. Refocusing provides fine-tuning by continuously moving the lens forward between 0 mm and 10 mm. Super-resolution was performed at a shift of Δ+n=82 pixels between captured microimages.

For the example focused plenoptic camera implementation, a medium format camera, using an 80-mm lens and a 39-megapixel digital back, is used. Pixel size is 6.8 μm. The lens is mounted on the camera with a 13 mm extension tube, which provides the needed spacing to establish an appropriate distance from the focal plane to the microlens array and the sensor as described above. In the example focused plenoptic camera, the microlens array works with the sensor without removing the cover glass. For that purpose, the microlenses have focal length of 1.5 mm and the array is placed directly on the cover glass of the sensor, after removing the infrared filter. A method for providing variable additional spacing of up to 0.2 mm is provided for fine-tuning the microlens focus.

FIG. 8 illustrates an example embodiment of a focused plenoptic camera based on a large-format film camera that is somewhat similar to the example focused plenoptic camera described in this section. More generally, FIGS. 6 through 8 illustrate example film camera and digital camera embodiments of a focused plenoptic camera which may be configured as described herein to support super-resolution, and further illustrate both fixed and adjustable embodiments of the focused plenoptic camera. It is noted that these are example embodiments, and are not intended to be limiting. Other embodiments of the focused plenoptic camera are possible and anticipated.

The pitch of the microlenses is 500 μm with a precision better than 1 μm. This precision makes subpixel registration and the method of super-resolution possible. The large pitch makes the microlenses work with an F-number of the main lens as low as 3. Note that if such an array were used with a conventional plenoptic camera, it would result in a final image of size less than 100×100 pixels after rendering. That is why conventional plenoptic camera designs required removal of the cover glass and a very small distance to the sensor—in order to accommodate a low F-number at small pitch.

Next, the range of depths in the real world at which super-resolution works is estimated. As noted previously, in the example focused plenoptic camera with the appropriate chosen settings for 3×3 super-resolution from Table 2, the image of infinity is formed at distance 13.6 mm from the microlenses, corresponding to n=8. The next closer plane good for 3×3 super-resolution would be at 12.2 mm, and between them there is a plane where super-resolution would fail. Assuming that the image is well super-resolved within 0.5 mm (from 13.1 mm to 13.6 mm), consider the lens equation for the main camera lens:

$$(A-F)(B-F)=F^2 \quad (4)$$

where F=80 mm is the focal length of the main lens, A is the distance to the object, and B is the distance to the image. The estimate above that B−F=0.5 mm leads to a distance A=12.8 m. Anything that is located at more than 13 m from the camera is well super resolved. Note that this plane can be brought closer by selecting different camera parameters.

The example images presented in FIGS. 36 through 45 were initially captured in color using the example focused plenoptic camera implementation and settings as described above, and have been converted to grayscale for display purposes.

Figure 36:
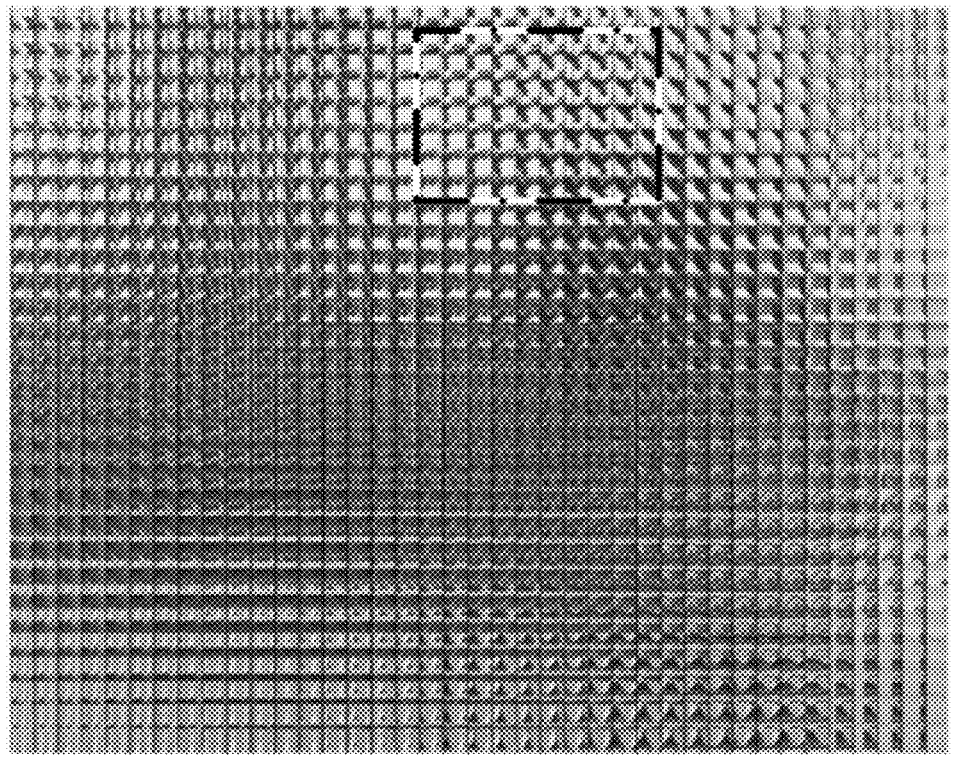
FIG. 36 shows a portion of a light-field image, or flat, captured by the example focused plenoptic camera.
Figure 37:
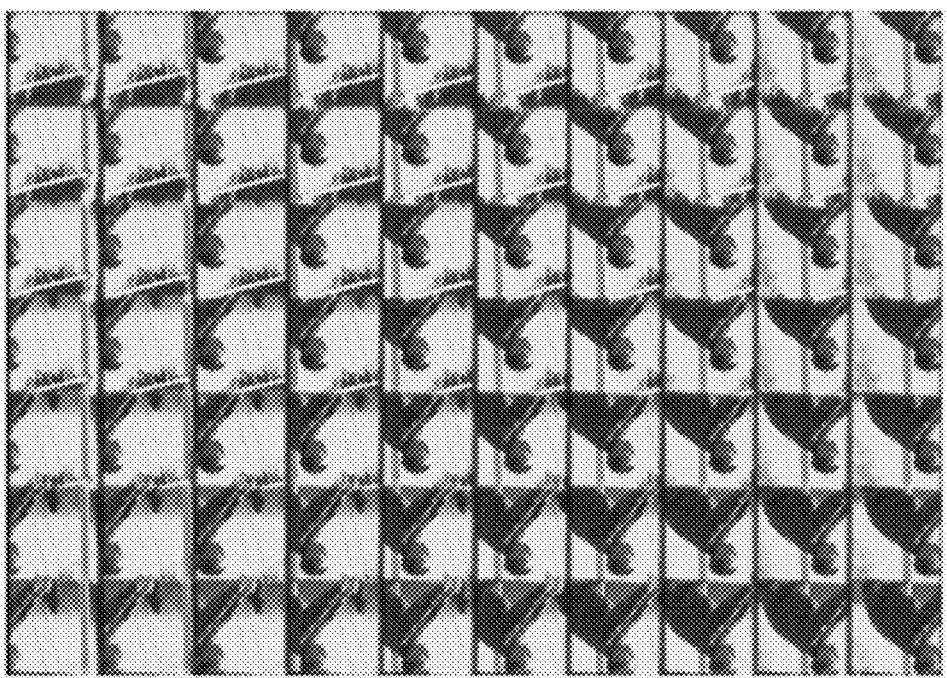
FIG. 37 is a zoom-in to the region indicated by the rectangle in FIG. 36.

FIG. 36 shows a portion of a light-field image, or flat, captured by the example focused plenoptic camera. No part of the image is in focus at the image plane; hence, the light-field image appears blurry at a macro level. However, by closely examining the microimages themselves, it can be seen that the microimages are well focused, as shown in FIG. 37, which is a zoom-in to the region indicated by the rectangle in FIG. 36. Note that a square main lens aperture was used to provide efficient use of sensor space, so the microimages are squares and not circles.

Figure 38:
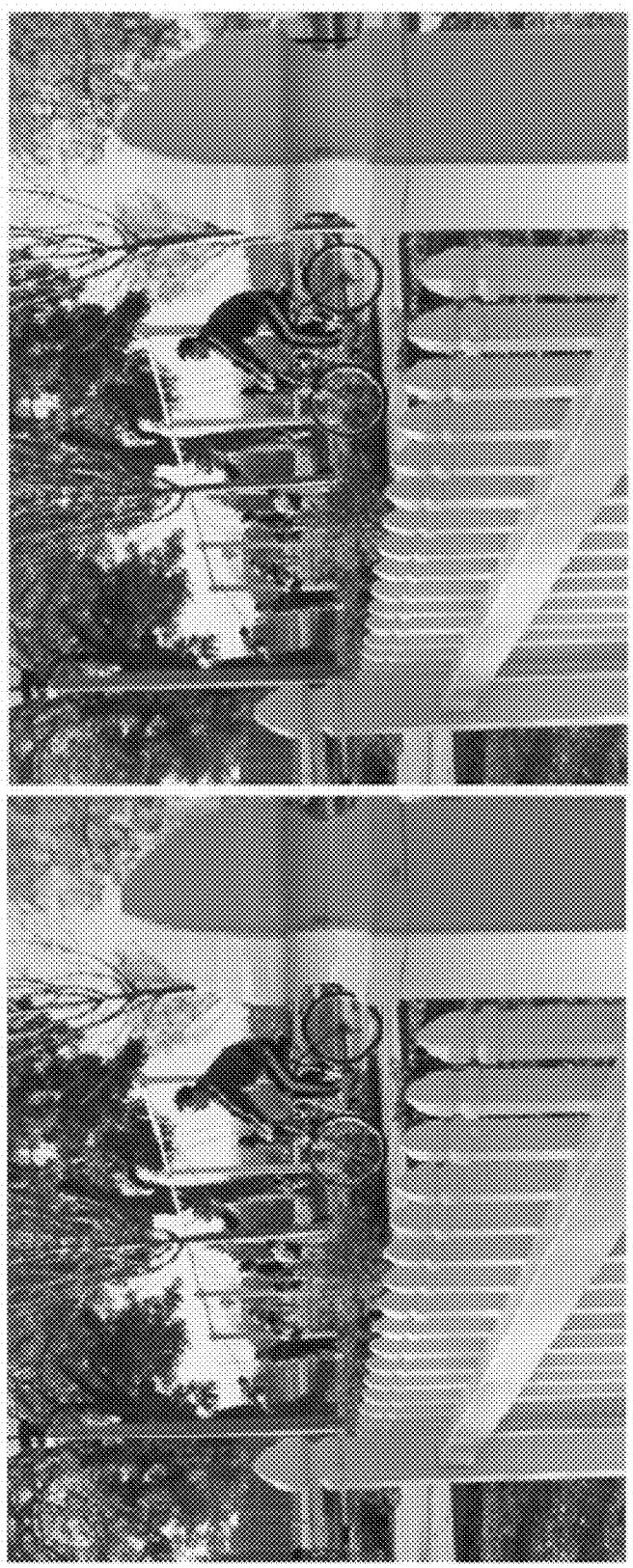
FIG. 38 shows a stereo rendering of the captured flat of FIG. 36, rendered using a focused plenoptic camera rendering algorithm without super-resolution.
Figure 39:
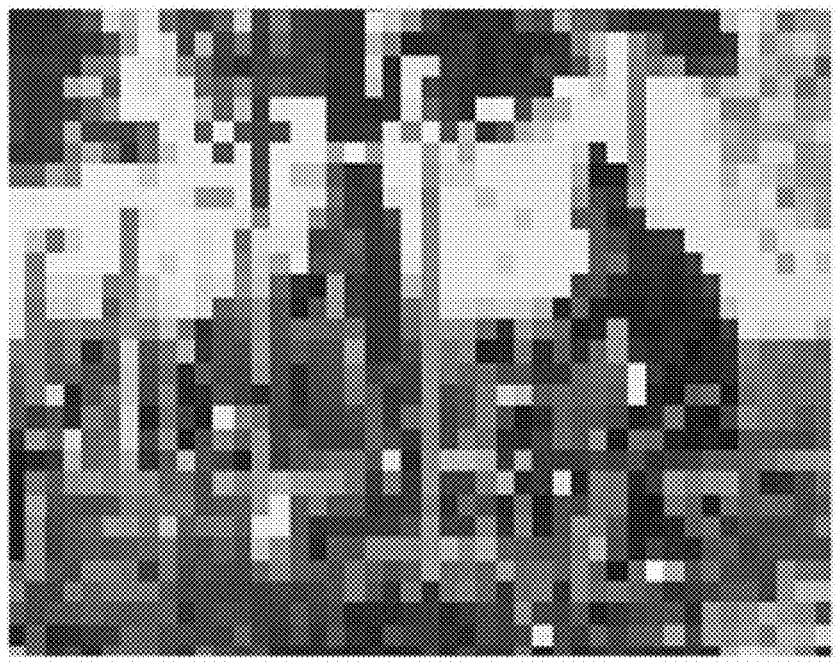
FIG. 39 shows a rendering of the flat of FIG. 36 according to a conventional plenoptic camera rendering technique that uses one pixel per microlens.
Figure 40:
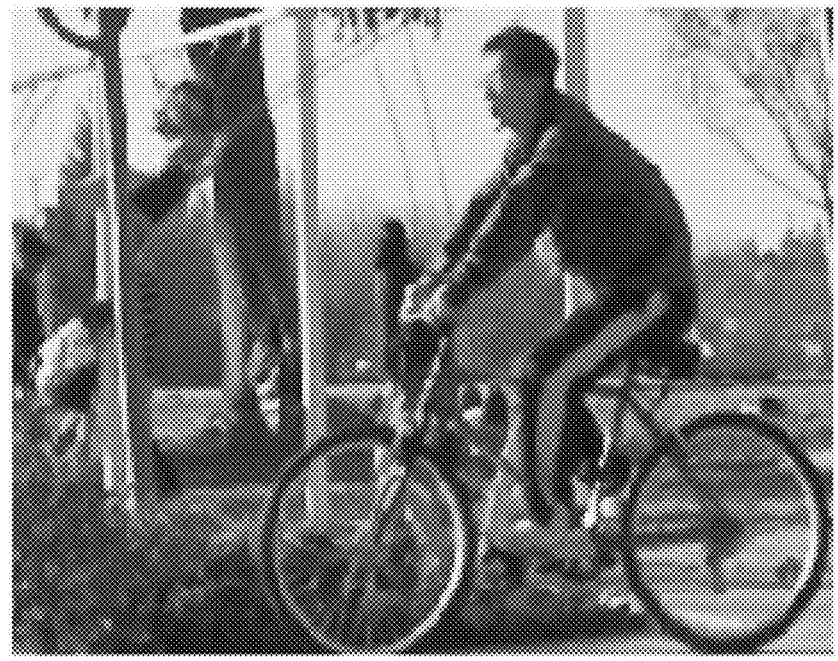
FIG. 40 shows a rendering of the flat of FIG. 36 according to a focused plenoptic camera rendering algorithm without super-resolution.
Figure 41:
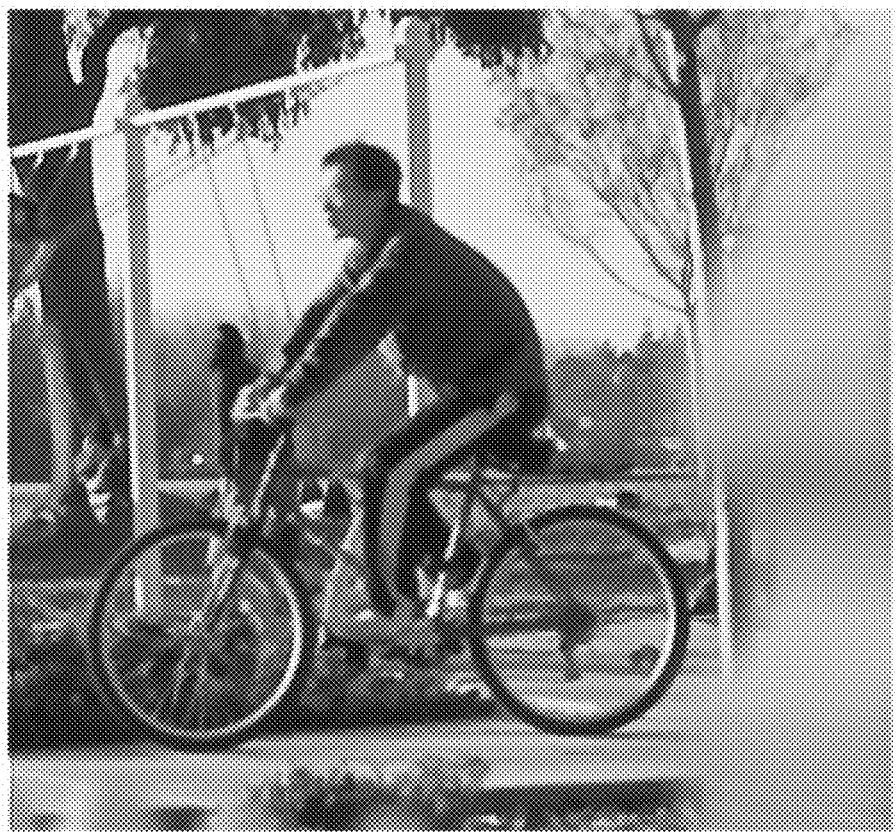
FIG. 41 shows a rendering of the flat of FIG. 36 according to a focused plenoptic camera super-resolution rendering algorithm.

FIG. 38 shows a stereo rendering of the captured flat of FIG. 36, rendered using a focused plenoptic camera rendering algorithm without super-resolution (see, e.g., FIGS. 22 and 25). FIGS. 39 through 41 show results of the different rendering approaches. To show the effects of the different rendering approaches more clearly, smaller portions of the image are shown. Rendering the light-field according to conventional plenoptic camera rendering techniques that use one pixel per microlens yields an image with very low resolution, as shown in FIG. 39. A focused plenoptic camera rendering algorithm without super-resolution (see, e.g., FIGS. 22 and 25) enables significant resolution improvement, as shown in FIG. 40. A slightly different view of the same light field rendered with a focused plenoptic camera super-resolution rendering algorithm according to some embodiments is shown in FIG. 41. The image in FIG. 41 is clearly of higher resolution than the images in FIGS. 39 and 40.

Figure 42:
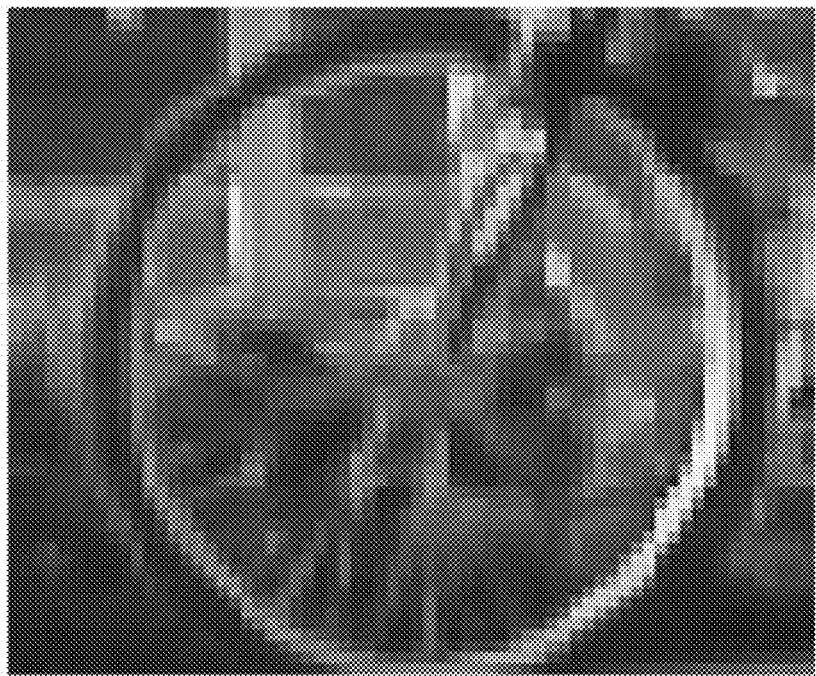
FIG. 42 shows a close-up of the front wheel of the bicycle from FIG. 40, rendered with a focused plenoptic camera rendering algorithm without super-resolution.
Figure 43:
FIG. 43 shows a close-up of the front wheel of the bicycle from FIG. 40, rendered according to a focused plenoptic camera super-resolution rendering algorithm.

FIG. 42 shows a close-up of the front wheel of the bicycle rendered with a focused plenoptic camera rendering algorithm without super-resolution; pixilation is obvious. FIG. 43 shows a close-up of the front wheel of the bicycle rendered with the focused plenoptic camera and super-resolution, using the focused plenoptic camera super-resolution rendering algorithm according to some embodiments. The image in FIG. 43 is clearly of higher resolution than the image in FIG. 42.

Figure 44:
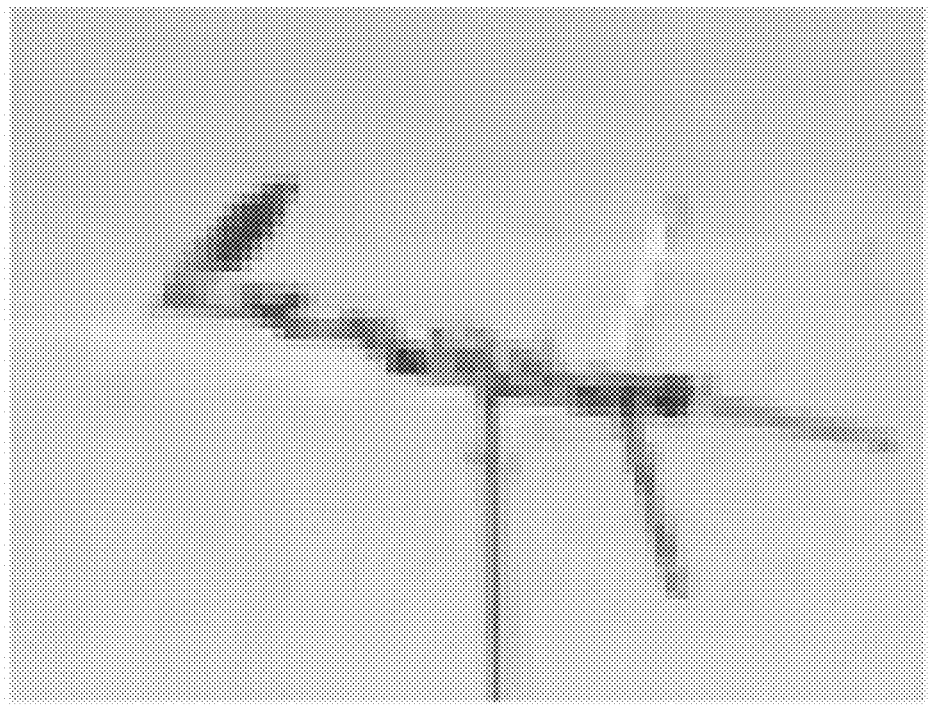
FIG. 44 shows a rendering from light-field data using a focused plenoptic camera rendering algorithm without super-resolution.
Figure 45:
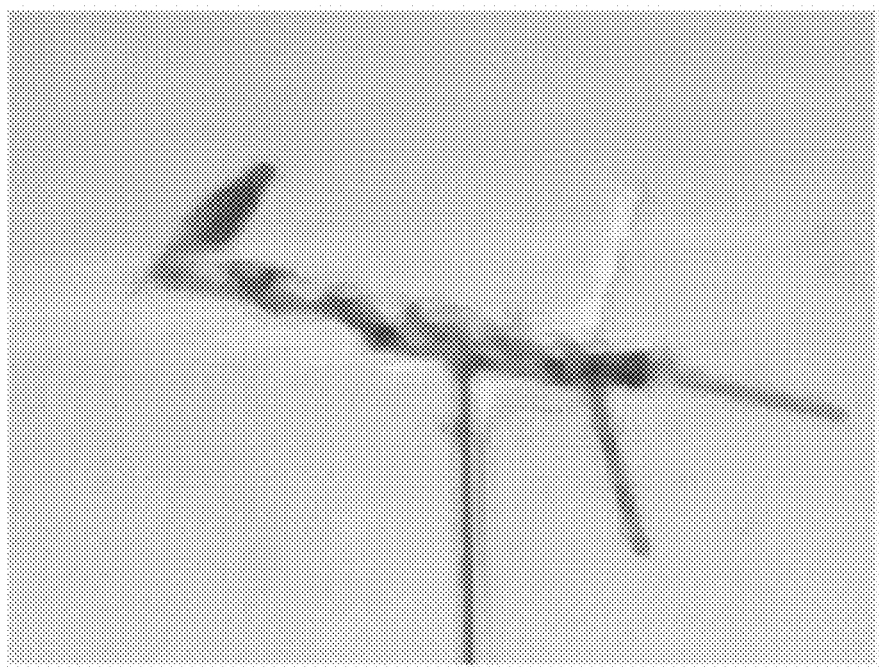
FIG. 45 shows a rendering from the same light-field data used in FIG. 44, but using a focused plenoptic camera super-resolution rendering algorithm.

FIGS. 44 and 45 show an image of a bird on an antenna, rendered from a flat captured with a focused plenoptic camera. The image in FIG. 44 is rendered from the light-field data using a focused plenoptic camera rendering algorithm without super-resolution. The image in FIG. 45 is a super-resolved rendering from the same data, rendered using the focused plenoptic camera super-resolution rendering algorithm according to some embodiments. Pixilation can clearly be seen in the image of FIG. 44, and the improvement gained with super-resolution rendering can be seen in FIG. 45.

Implementations of Rendering Methods

Figure 23:
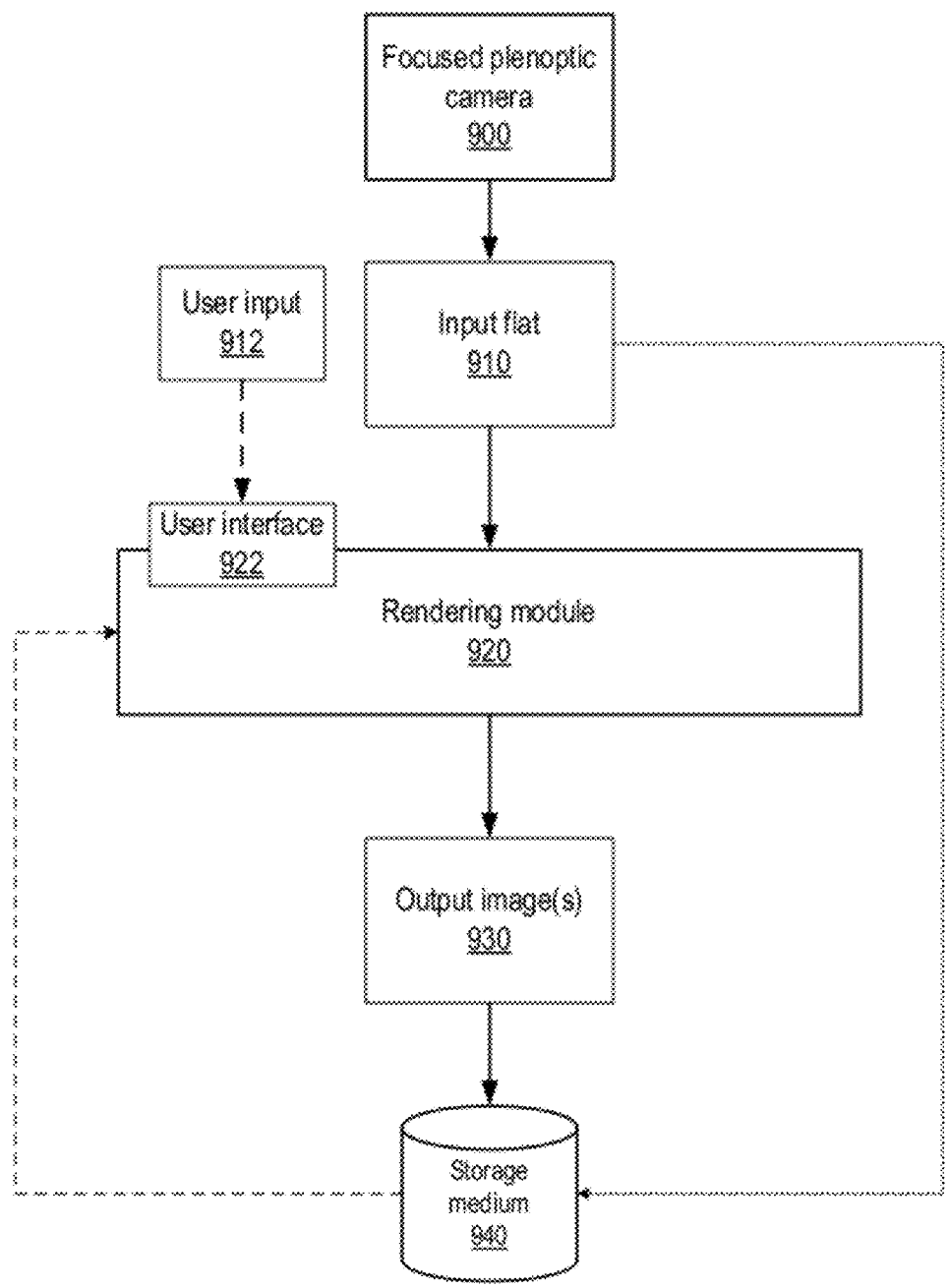
FIG. 23 illustrates a rendering module rendering a high-resolution image from a flat captured, for example, by a focused plenoptic camera, according to some embodiments.

FIG. 23 illustrates a rendering module rendering images from a flat captured, for example, by various embodiments of a focused plenoptic camera as described herein. Rendering module 920 may, for example, implement light-field rendering methods as described in FIG. 22 and/or as described in FIG. 25. Rendering module 920 may instead, or may also, implement super-resolution methods for rendering super-resolved images from flats captured using appropriately configured focused plenoptic cameras, such as the super-resolution rendering methods described in FIGS. 34 and 35. FIG. 24 illustrates an example computer system on which embodiments of rendering module 920 may be implemented. In some embodiments of a focused plenoptic camera, rendering module 920 may be implemented in the camera, e.g. in captured data processing module 260 of focused plenoptic camera 200 illustrated in FIG. 7. Referring to FIG. 23, rendering module 920 receives an input flat 910 captured by a focused plenoptic camera, such as one of the embodiments of focused plenoptic cameras described herein. Example portions of a flat as may be captured by various embodiments of a focused plenoptic camera are illustrated in FIGS. 9, 17, 36 and 37. Rendering module 920 then processes the input image 910 according to an appropriate rendering method or methods as described herein, for example the super-resolution rendering methods described in FIGS. 34 and 35. Rendering module 920 generates as output one or more images 930. FIGS. 19 and 20 illustrate example high-resolution images that may be rendered and output by rendering module 920. FIGS. 41, 43, and 45 illustrate example super-resolved images that may be rendered according to a super-resolution rendering method as described in FIGS. 34 and 35. Output image 930 may, for example, be stored to a storage medium 940, such as system memory, a disk drive, DVD, CD, etc. The dashed line from input image 910 to storage medium 940 indicates that the original (input) flat 910 may also be stored. The dashed line from storage medium 940 to rendering module 920 indicates that stored images may be retrieved and further processed by rendering module 920.

In some embodiments, rendering module 920 may provide a user interface 922 via which a user may interact with the module 920, for example to specify or otherwise manage input flats 910 and output images 930 as described herein. In some embodiments, examination of microimages to determine the direction of movement of edges may be performed by a user via the user interface 922. The user may mark or otherwise indicate areas that the user determines need be inverted via the user interface 922. In some embodiments, examination of the microimages to determine the direction of movement of edges may be performed automatically by rendering module 920. Some embodiments may allow either manual or automatic examination and detection, or a combination thereof, to be used. The user interface 922 may also provide tools whereby a user may specify areas of two or more rendered images that are to be combined to produce a higher-quality output image. The user interface 922 may also provide one or more user interface elements whereby the user may select parameters of the super-resolution rendering method, such as the super-resolution mode (2×2, 3×3, etc.) to be used to super-resolve a flat.

Example System

Embodiments of a rendering module and/or one or more of the various rendering methods as described herein may be executed on one or more computer systems, which may interact with various other devices. One such computer system is illustrated by FIG. 24. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, computer system 1000 may be a digital camera.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the various rendering methods disclosed herein may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 24, memory 1020 may include program instructions 1025, configured to implement embodiments of a rendering module as described herein, and data storage 1035, comprising various data accessible by program instructions 1025. In one embodiment, program instructions 1025 may include software elements of embodiments of a rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A camera, comprising:
 a photosensor configured to capture light projected onto the photosensor, wherein the photosensor comprises a plurality of pixels;
 an objective lens, wherein the objective lens is configured to refract light from a scene located in front of the camera to form an image of the scene at an image plane of the objective lens; and
 a microlens array positioned between the objective lens and the photosensor, wherein the microlens array comprises a plurality of microlenses, wherein the plurality of microlenses are focused on the image plane and not on the objective lens, and wherein each microlens samples a respective region of the image of the scene formed at the image plane by the objective lens, and wherein each region of the image of the scene sampled by the microlenses partially overlaps at least one other region of the image of the scene sampled by the microlenses;

wherein each microlens of the microlens array is configured to project a respective region of the image of the scene sampled by the microlens onto a separate location on the photosensor, wherein each pixel of each said location on the photosensor samples radiance from a particular area of the image of the scene, and wherein the areas of the image of the scene sampled by the pixels of each said location on the photosensor partially overlap the areas of the image of the scene sampled by the pixels of at least one other location on the photosensor onto which an overlapping region of the image of the scene is projected;

wherein the photosensor is configured to capture a flat that includes each of the regions of the image of the scene projected onto the photosensor by the microlenses in a separate microimage in the flat; and wherein the flat is configured to be processed by a super-resolution technique that interleaves pixels in neighboring microimages according to a subpixel shift that indicates the amount of overlap of the pixels to render a high-resolution image of the scene.

2. The camera as recited in claim 1, wherein the super-resolution technique applies deconvolution to the high-resolution image of the scene to deblur the high-resolution image of the scene.

3. The camera as recited in claim 1, wherein the subpixel shift is determined according to configuration values of the focused plenoptic camera.

4. The camera as recited in claim 3, wherein the configuration values include pitch of the microlenses in the microlens array, distance from the microlenses to the photosensor, and distance from the microlenses to the image plane of the objective lens.

5. The camera as recited in claim 1, wherein the image plane of the objective lens is at one focal length from the objective lens and at depth infinity relative to the microlenses.

6. The camera as recited in claim 1, wherein the camera is configured to store the captured flat to a memory device.

7. A method, comprising:
obtaining a flat comprising a plurality of separate portions of an image of a scene, wherein each of the plurality of portions is in a separate region of the flat, wherein each portion of the image of the scene partially overlaps at least one other portion of the image of the scene, and wherein areas of the image of the scene sampled at pixels of each said portion partially overlap areas of the image sampled by pixels of at least one other portion that partially overlaps said portion;
determining a subpixel shift that indicates the amount of overlap of the pixels in the portions of the image; and
interleaving pixels in neighboring portions of the image according to the subpixel shift to render a high-resolution image of the scene.

8. The method as recited in claim 7, further comprising applying deconvolution to the interleaved image of the scene to deblur the high-resolution image of the scene.

9. The method as recited in claim 7, wherein said determining a subpixel shift that indicates the amount of overlap of the pixels in the portions of the image comprises determining the subpixel shift according to configuration values of a focused plenoptic camera used to capture the flat.

10. The method as recited in claim 9, wherein the configuration values include pitch of microlenses in a microlens array of the focused plenoptic camera, distance from the microlenses to a photosensor of the focused plenoptic camera, and distance from the microlenses to an image plane of an objective lens of the focused plenoptic camera at which the flat was captured.

11. The method as recited in claim 10, wherein the image plane of the objective lens is at one focal length from the objective lens and at depth infinity relative to the microlenses.

12. The method as recited in claim 7, wherein said determining a subpixel shift that indicates the amount of overlap of the pixels in the portions of the image comprises determining the subpixel shift according to an analysis of at least two of the separate regions of the flat that include overlapping portions of the image of the scene.

13. The method as recited in claim 7, wherein said interleaving pixels in neighboring portions of the image according to the subpixel shift to render a high-resolution image of the scene comprises:
for each portion of the image, interleaving the pixels of said portion with the pixels of $(L_S^2-1)$ neighboring portions that overlap said portion to generate an interleaved subimage, where $L_S$ is a level of super-resolution determined according to the subpixel shift; and
appropriately assembling the interleaved subimages to generate the high-resolution image of the scene.

14. A non-transitory computer-readable storage medium storing program instructions, wherein the program instructions are computer-executable to implement:
obtaining a flat comprising a plurality of separate portions of an image of a scene, wherein each of the plurality of portions is in a separate region of the flat, wherein each portion of the image of the scene partially overlaps at least one other portion of the image of the scene, and wherein areas of the image of the scene sampled at pixels of each said portion partially overlap areas of the image sampled by pixels of at least one other portion that partially overlaps said portion;
determining a subpixel shift that indicates the amount of overlap of the pixels in the portions of the image; and
interleaving pixels in neighboring portions of the image according to the subpixel shift to render a high-resolution image of the scene.

15. The non-transitory computer-readable storage medium as recited in claim 14, wherein the program instructions are computer-executable to implement applying deconvolution to the interleaved image of the scene to deblur the high-resolution image of the scene.

16. The non-transitory computer-readable storage medium as recited in claim 14, wherein, in said determining a subpixel shift that indicates the amount of overlap of the pixels in the portions of the image, the program instructions are computer-executable to implement determining the subpixel shift according to configuration values of a focused plenoptic camera used to capture the flat.

17. The non-transitory computer-readable storage medium as recited in claim 16, wherein the configuration values include pitch of microlenses in a microlens array of the focused plenoptic camera, distance from the microlenses to a photosensor of the focused plenoptic camera, and distance from the microlenses to an image plane of an objective lens of the focused plenoptic camera at which the flat was captured.

18. The non-transitory computer-readable storage medium as recited in claim 17, wherein the image plane of the objective lens is at one focal length from the objective lens and at depth infinity relative to the microlenses.

19. The non-transitory computer-readable storage medium as recited in claim 14, wherein, in said determining a subpixel shift that indicates the amount of overlap of the pixels in the portions of the image, the program instructions are computer-executable to implement determining the subpixel shift according to an analysis of at least two of the separate regions of the flat that include overlapping portions of the image of the scene.

20. The non-transitory computer-readable storage medium as recited in claim 14, wherein, in said interleaving pixels in neighboring portions of the image according to the subpixel shift to render a high-resolution image of the scene, the program instructions are computer-executable to implement:

for each portion of the image, interleaving the pixels of said portion with the pixels of $(L_S^2-1)$ neighboring portions that overlap said portion to generate an interleaved subimage, where $L_S$ is a level of super-resolution determined according to the subpixel shift; and appropriately assembling the interleaved subimages to generate the high-resolution image of the scene.

\* \* \* \* \*